United States Patent
Kodaira et al.

(10) Patent No.: US 11,926,081 B2
(45) Date of Patent: Mar. 12, 2024

(54) INJECTION MOLDING APPARATUS WITH A MOLD CONVEYOR, AND METHOD OF CONTROLLING THE MOLD CONVEYOR AND THE INJECTION MOLDING APPARATUS

(71) Applicant: Canon Virginia, Inc., Newport News, VA (US)

(72) Inventors: Koki Kodaira, Tokyo (JP); Yuichi Yanahara, Moriyama (JP)

(73) Assignee: Canon Virginia, Inc., Newport News, VA (US)

( * ) Notice: Subject to any disclaimer, the term of this patent is extended or adjusted under 35 U.S.C. 154(b) by 59 days.

(21) Appl. No.: 17/603,560

(22) PCT Filed: Apr. 10, 2020

(86) PCT No.: PCT/US2020/027776
§ 371 (c)(1),
(2) Date: Oct. 13, 2021

(87) PCT Pub. No.: WO2020/214507
PCT Pub. Date: Oct. 22, 2020

(65) Prior Publication Data
US 2022/0193963 A1    Jun. 23, 2022

Related U.S. Application Data

(60) Provisional application No. 62/834,256, filed on Apr. 15, 2019.

(51) Int. Cl.
*B29C 45/00* (2006.01)
*B29C 45/04* (2006.01)
*B29C 45/17* (2006.01)

(52) U.S. Cl.
CPC ...... *B29C 45/0408* (2013.01); *B29C 45/1756* (2013.01)

(58) Field of Classification Search
CPC ............ B29C 45/1742; B29C 45/0408; B29C 45/1756; B29C 45/17; B29C 33/30
See application file for complete search history.

(56) References Cited

U.S. PATENT DOCUMENTS 3,973,891 A * 8/1976 Yamada ............... B29C 45/0433
425/DIG. 201
4,472,127 A * 9/1984 Cyriax ................ B29C 45/1742
425/186
(Continued)

FOREIGN PATENT DOCUMENTS

CN        202491388    * 10/2012    ............. B29C 45/64
CN        202491388 U    10/2012
(Continued)

*Primary Examiner* — Alison L Hindenlang
*Assistant Examiner* — Debjani Roy
(74) *Attorney, Agent, or Firm* — Canon U.S.A., Inc. IP Division

(57) ABSTRACT

An injection molding system including an injection molding apparatus that performs injection molding with a mold, and a conveyor apparatus that moves the mold to a position in the injection molding apparatus, wherein the improvement to the injection molding system includes a connection part configured to fix the conveyor apparatus with the injection molding apparatus such that a side surface of the injection molding apparatus and a side surface of the conveyor apparatus facing each other are spaced apart.

16 Claims, 22 Drawing Sheets

(56) References Cited

U.S. PATENT DOCUMENTS

| | | | |
|---|---|---|---|
| 11,104,050 B2 | 8/2021 | Nakamura | |
| 2018/0009146 A1* | 1/2018 | Nakamura | ............... B29C 45/80 |

FOREIGN PATENT DOCUMENTS

| | | |
|---|---|---|
| JP | 2000-271994 A1 | 10/2000 |
| JP | 2002067094 A | 3/2002 |
| JP | 6121601 B1 | 4/2017 |
| JP | 2018001738 A | 1/2018 |

* cited by examiner

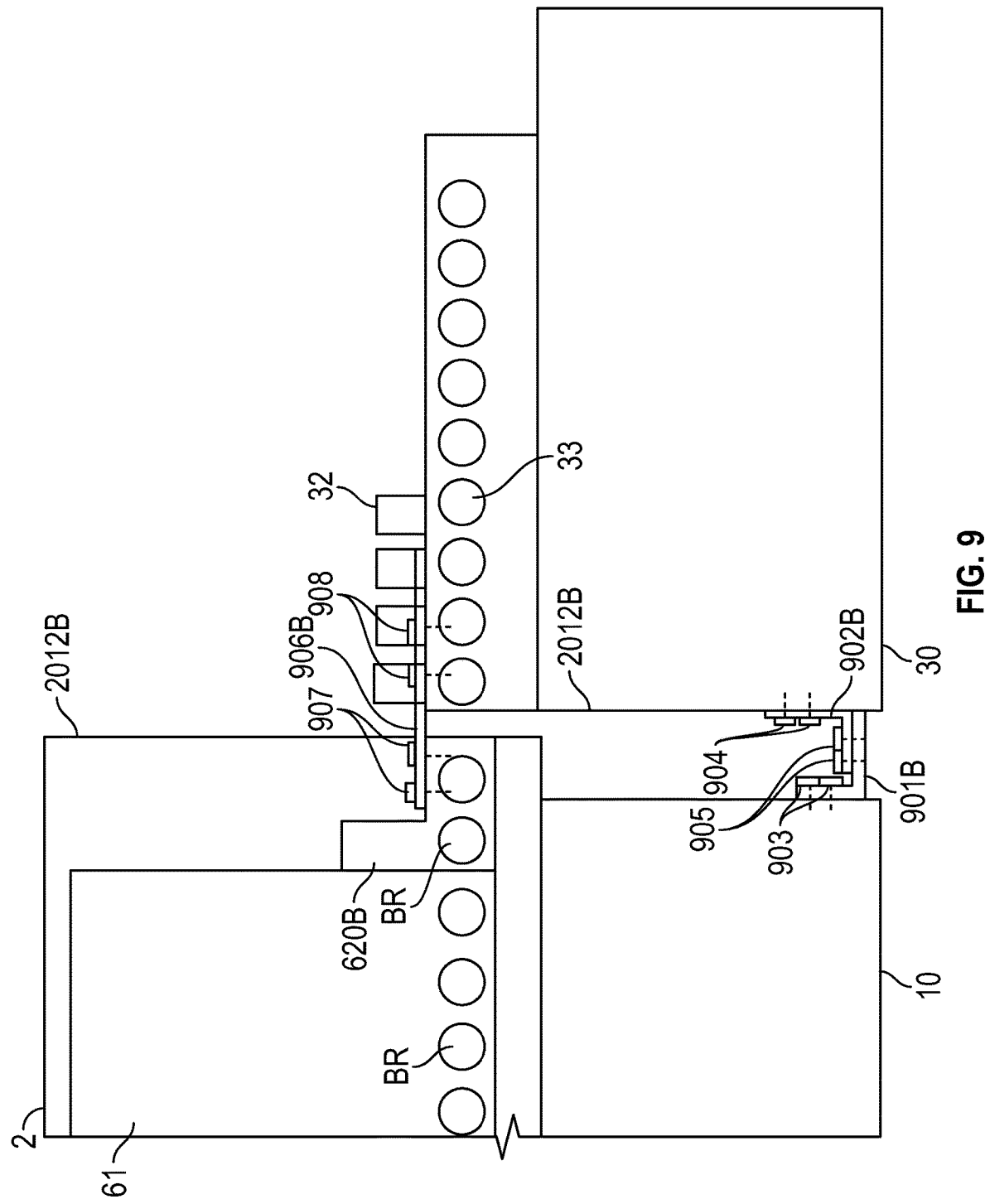

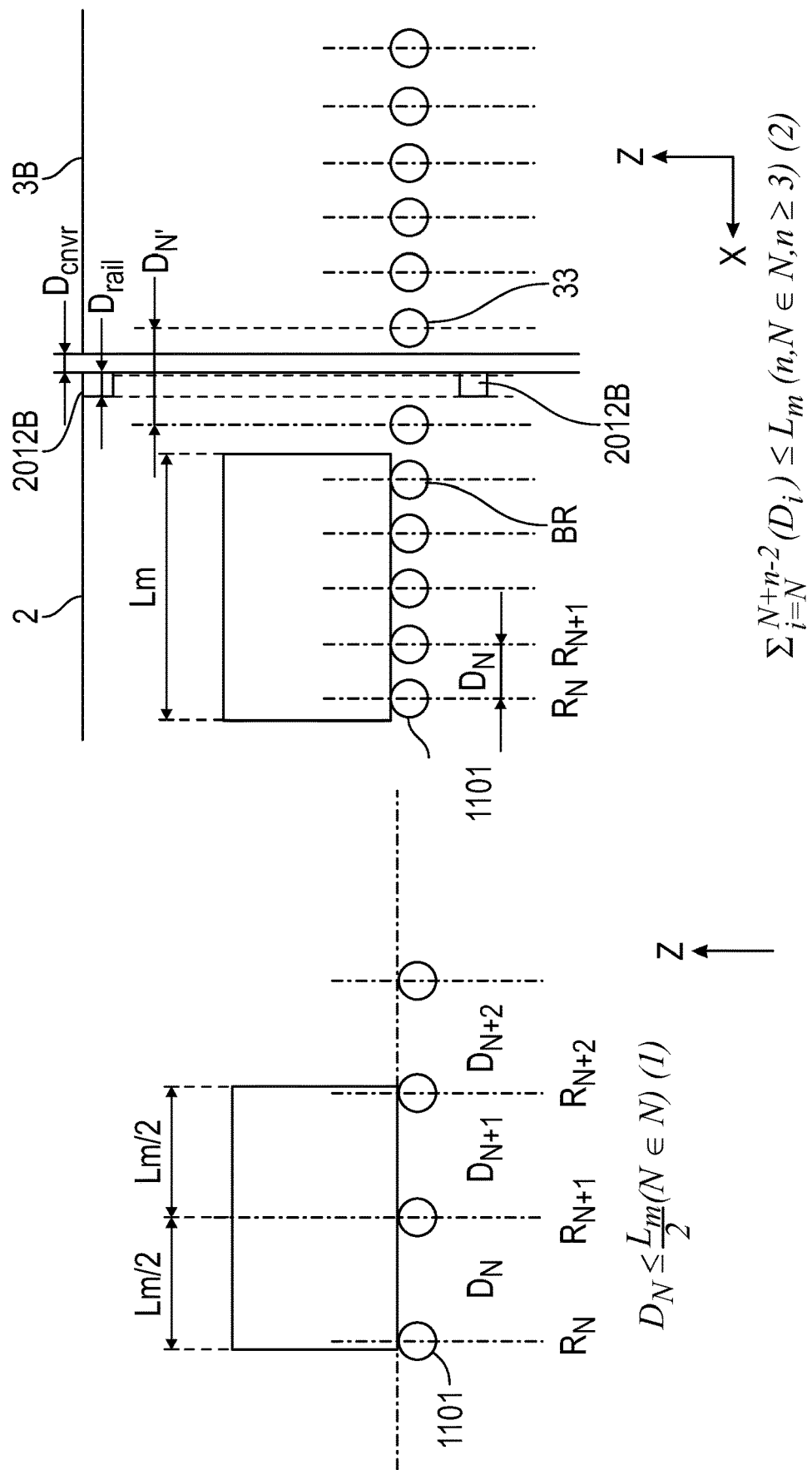

| Situation | Mode | IMM door on the mold insertion/ ejection side | IMM door on the opposite side of the mold insertion/ ejection side | Conveyor door on the mold insertion/ejection side | Conveyor door on the opposite side of the mold insertion/ ejection side |
|---|---|---|---|---|---|
| Insertion | Mode 1 | 3rd position | 3rd position | Closed | Closed |
|  | Mode 2 | 3rd position | 2nd position | Closed | - |
|  | Mode 3 | 1st or 3rd position | 2nd position | - | - |
| Molding Start | Mode 1 | 3rd position | 3rd position | Closed | Closed |
|  | Mode 2 | 3rd position | 2nd position | Closed | - |
|  | Mode 3 | 2nd position | 2nd position | - | - |
| During Injection Molding | Mode 1 | 3rd position | 3rd position | Closed | Closed |
|  | Mode 2 | 3rd position | 2nd position | Closed | - |
|  | Mode 3 | 2nd position | 2nd position | - | - |
| Ejection | Mode 1 | 3rd position | 3rd position | Closed | Closed |
|  | Mode 2 | 3rd position | 2nd position | Closed | - |
|  | Mode 3 | 1st or 3rd position | 2nd position | - | - |

FIG. 14

INJECTION MOLDING APPARATUS WITH A MOLD CONVEYOR, AND METHOD OF CONTROLLING THE MOLD CONVEYOR AND THE INJECTION MOLDING APPARATUS

CROSS-REFERENCE TO RELATED APPLICATION

This application claims the benefit of U.S. Provisional Application 62/834,256, which was filed on Apr. 15, 2019.

FIELD OF THE DISCLOSURE

The present disclosure relates to an injection molding apparatus with a mold conveyor, and method of controlling the mold conveyor and the injection molding apparatus.

BACKGROUND

Manufacturing of molded parts by an injection molding machine includes injecting a resin into a mold after clamping the mold, pressing the resin into the mold at a high pressure in order to compensate for a volume decrease due to solidification of the resin, keeping the molded part in the mold until the resin solidifies, and ejecting the molded part from the mold.

The injection molding processes are performed repeatedly to obtain the desired number of molded parts. After a predetermined number of molding are performed with one mold, the mold is ejected from the injection molding machine, the next mold is setup, and the next mold is inserted into the injection molding machine, and then the predetermined number of injection molding with the next mold will be performed. Because the mold is usually very heavy and operators' safety needs to be taken much care, while the insertion of the mold, the injection molding with the mold, and the ejection of the mold are being performed.

In the above-described molding approach, a method that uses two molds with one injection molding machine in order to enhance productivity has been proposed. For example, US 2018/0009146/Japanese patent publication No. 2018-001738/VN20160002505 are seen to discuss a system in which conveying devices 3A and 3B are arranged on both sides of an injection molding machine 2. In this system, molded parts are manufactured while alternating a plurality of molds by the conveying devices 3A and 3B for the one injection molding machine 2. FIG. 18 illustrates an injection molding system of US 2018/0009146/Japanese patent publication No. 2018-001738/VN20160002505.

SUMMARY

An injection molding system including an injection molding apparatus that performs injection molding with a mold, and a conveyor apparatus that moves the mold to a position in the injection molding apparatus, wherein the improvement to the injection molding system includes a connection part configured to fix the conveyor apparatus with the injection molding apparatus such that a side surface of the injection molding apparatus and a side surface of the conveyor apparatus facing each other are spaced apart.

These and other embodiments, objects, features, and advantages of the present disclosure will become apparent upon reading the following detailed description of exemplary embodiments of the present disclosure, when taken in conjunction with the appended drawings, and provided claims.

BRIEF DESCRIPTIONS OF DRAWINGS

The accompanying drawings, which are incorporated herein and form part of the specification, illustrate various embodiments, objects, features, and advantages of the present disclosure.

FIG. 9 is a side view of the injection molding system according to an exemplary embodiment.

FIG. 11A illustrates rollers on a conveyor apparatus and on the injection molding machine according to an exemplary embodiment.

FIG. 11B illustrates rollers on a conveyor apparatus and on the injection molding machine according to another exemplary embodiment.

FIG. 14 is a chart illustrating conditions of doors of the injection molding machine and of a conveyor apparatus according to an exemplary embodiment.

Figure 1:
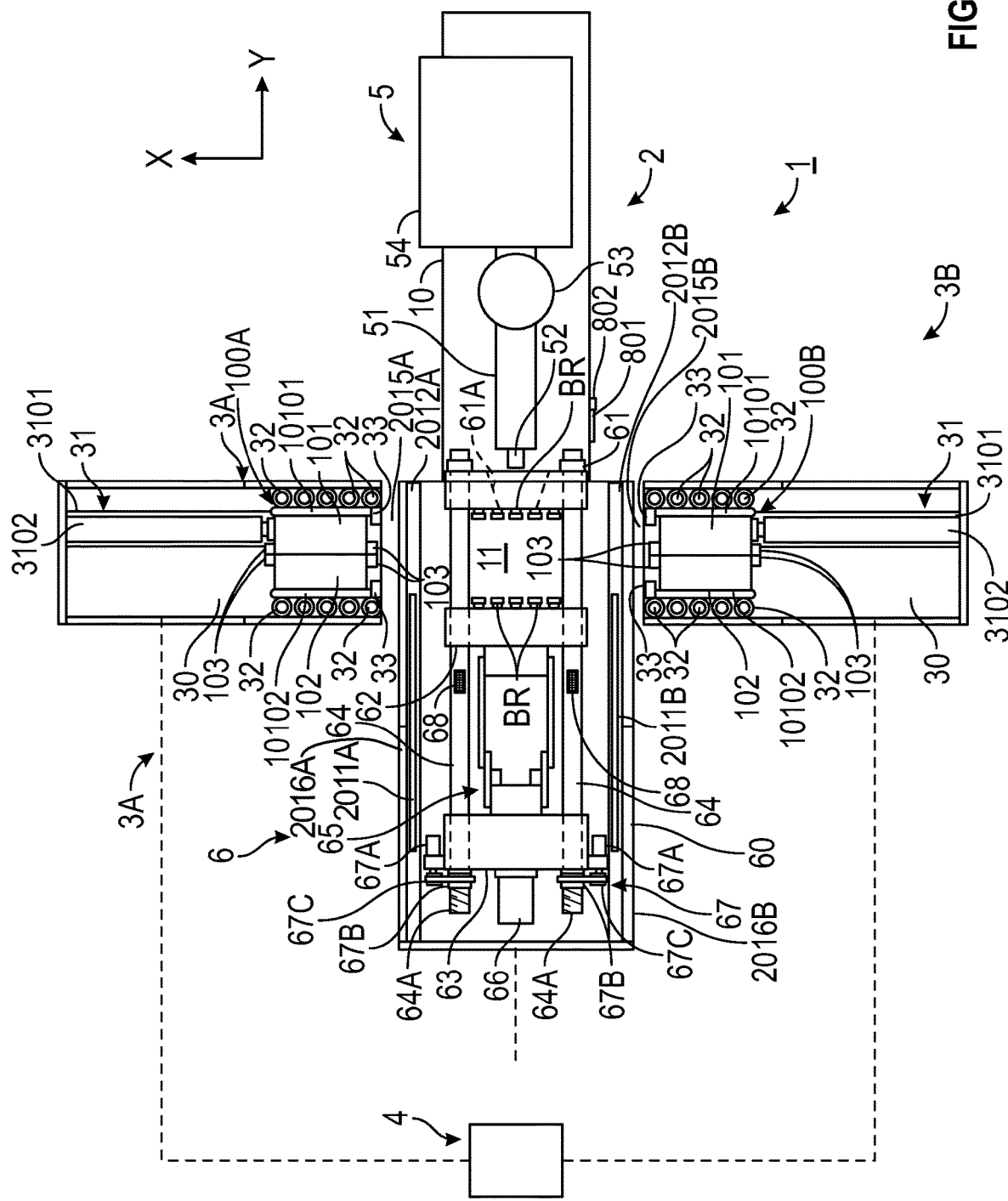
FIG. 1 is a top view of an injection molding system according to an exemplary embodiment.

Throughout the figures, the same reference numerals and characters, unless otherwise stated, are used to denote like features, elements, components or portions of the illustrated embodiments. Moreover, while the subject disclosure will now be described in detail with reference to the Figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION OF THE EXEMPLARY EMBODIMENTS

The present disclosure has several embodiments and relies on patents, patent applications, and other references for details known to those of the art. Therefore, when a patent, patent application, or other reference is cited or repeated herein, it should be understood that it is incorporated by reference in its entirety for all purposes as well as for the proposition that is recited.

With reference to the drawings, an injection molding system according to an exemplary embodiment of the present disclosure will be explained. The arrow symbols X and Y in each figure indicate horizontal directions that are orthogonal to each other, and the arrow symbol Z indicates a vertical (upright) direction. X direction is a direction along which a mold is inserted into the injection molding machine and Y direction is a direction along which the movable platen in the injection molding machine is moved.

Figure 2:
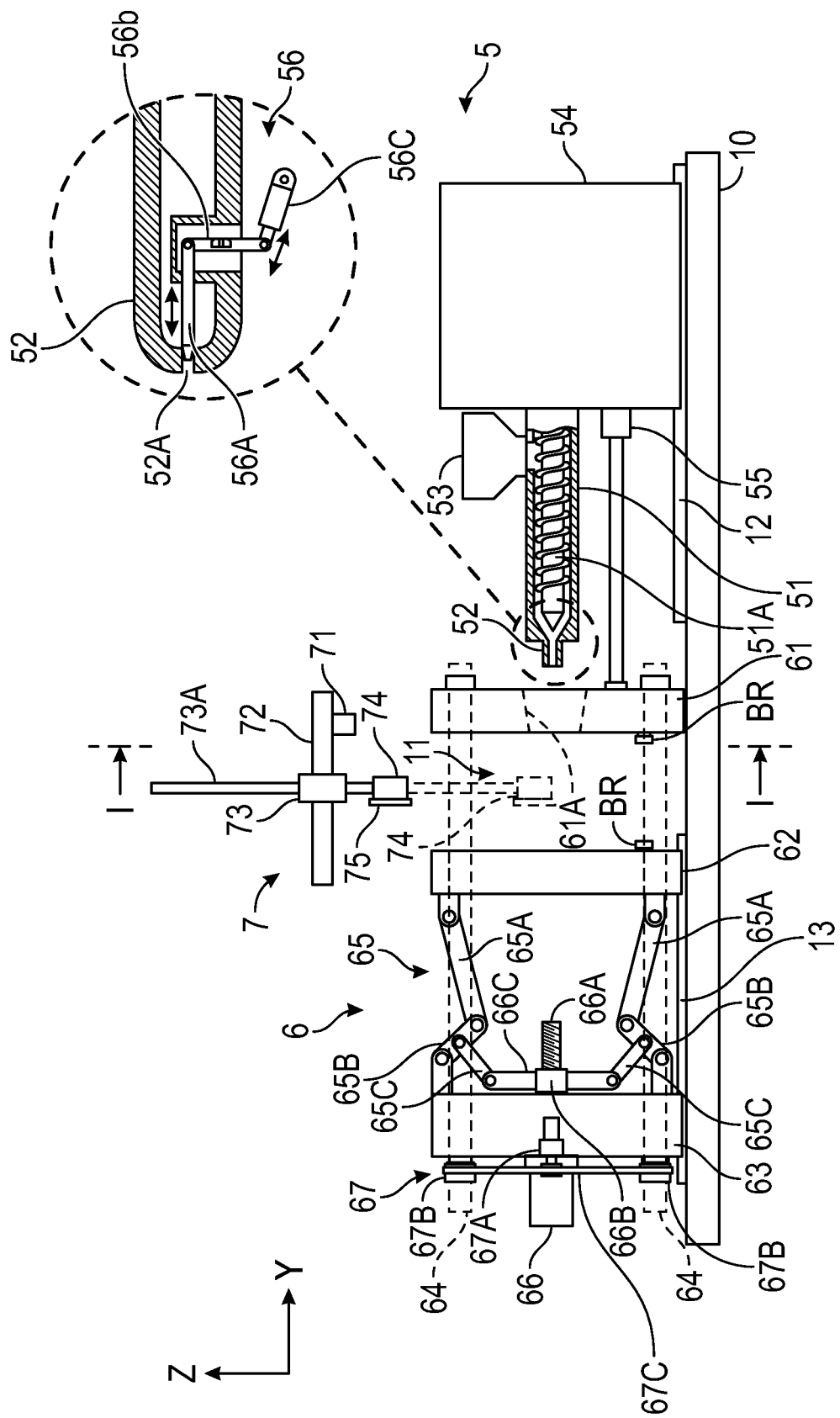
FIG. 2 is a side view of an injection molding system.
Figure 3:
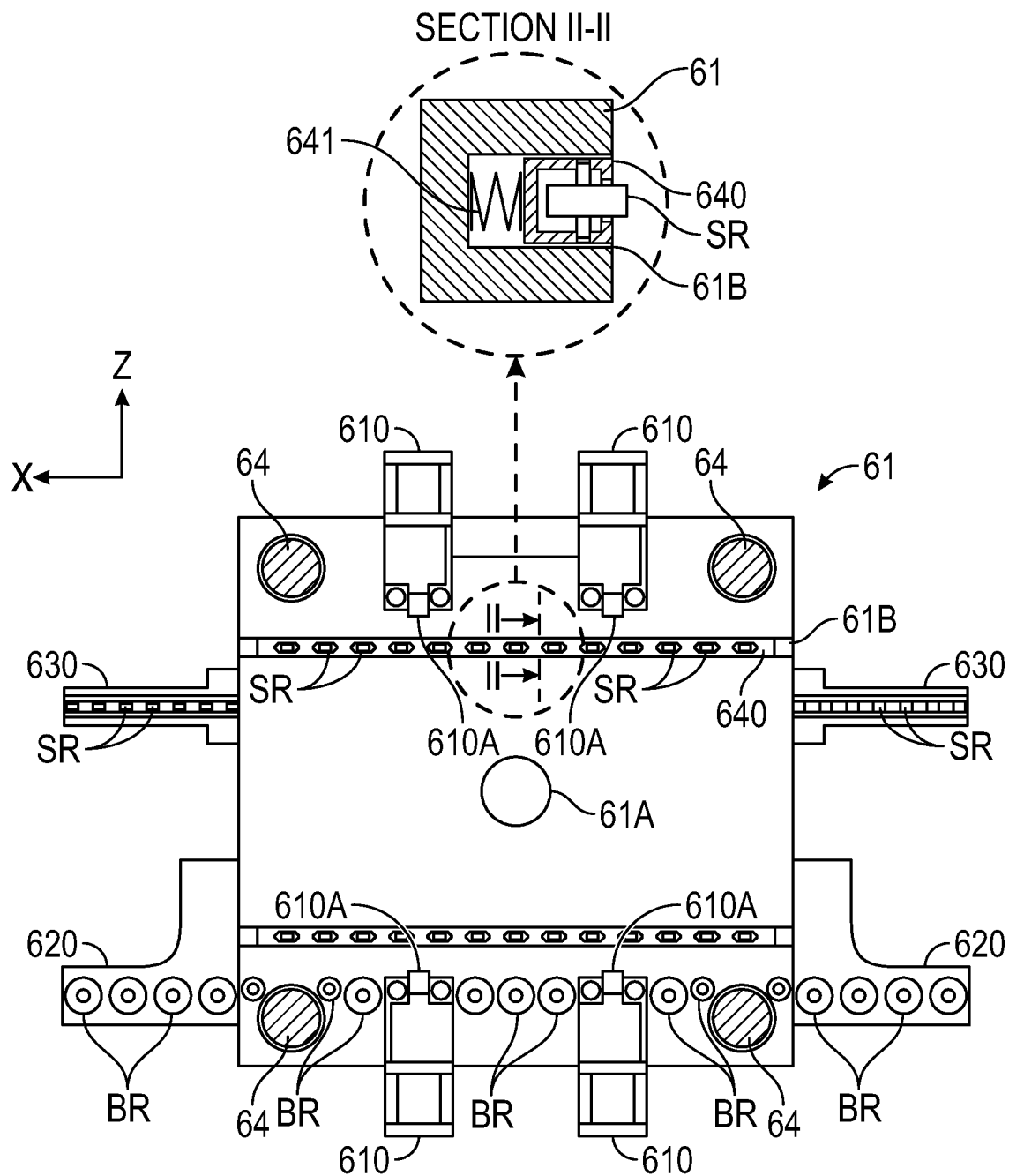
FIG. 3 is an end view of a fixed platen 61, and a figure view from the arrow direction of line I-I in FIG. 2.
Figure 20:
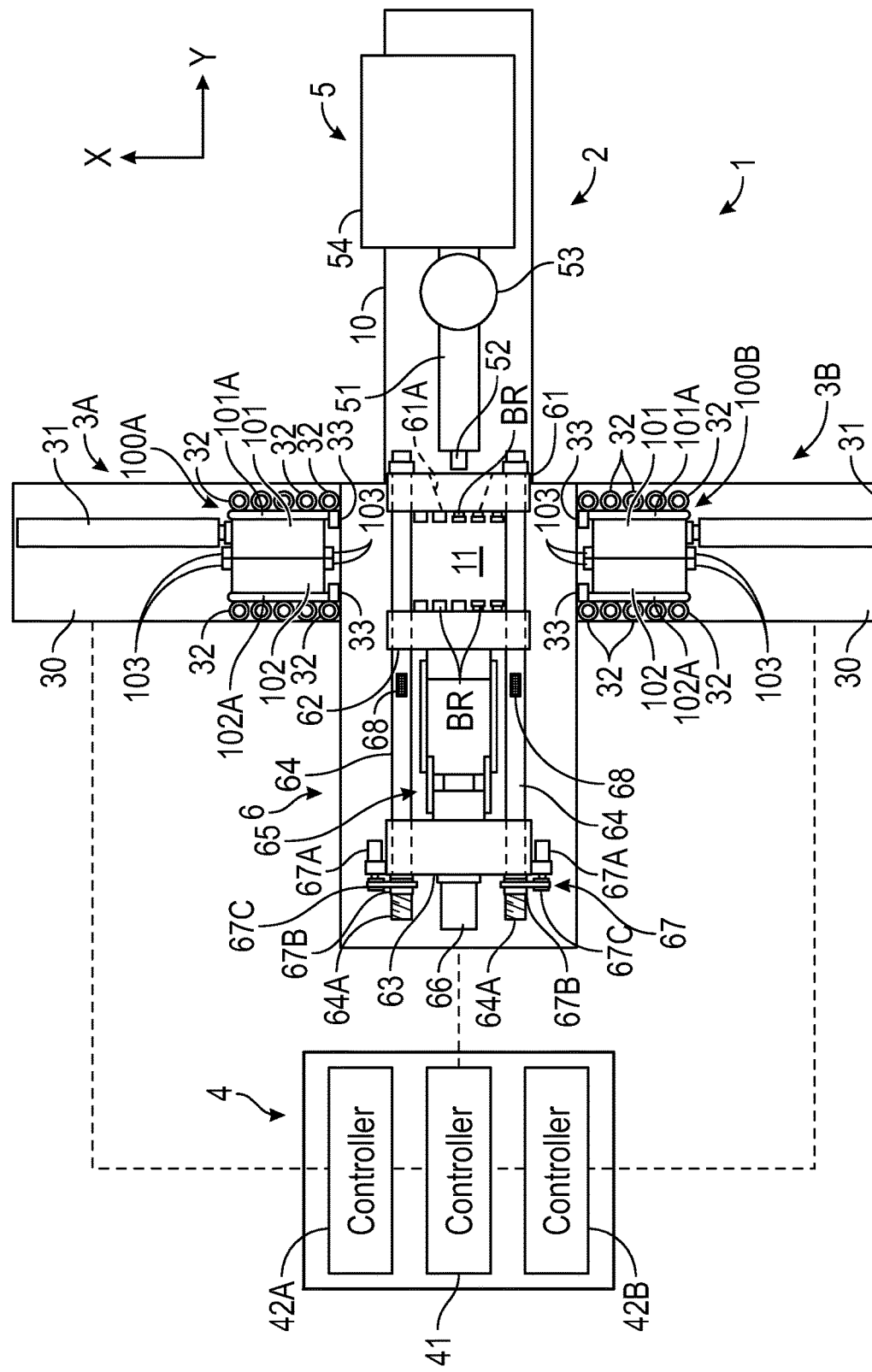
FIG. 20 illustrates an injection molding system.

FIGS. 20 and 2-3 illustrate an injection molding system discussed in US 2018/0009146/Japanese patent publication No. 2018-001738/VIN20160002505 and are being provided herein for information/description purposes only.

The injection molding system 1 includes a horizontal type injection molding machine 2 (IMM2), and conveyor devices 3A and 3B. The injection molding system 1 is configured to manufacture molded parts while inserting and ejecting multiple molds by conveyor devices 3A and 3B. Two molds, 100A and 100B are used.

The mold 100A/100B is a pair of a fixed mold 101 and a movable mold 102, which is opened/closed in relation to the fixed mold 101. The molded part is molded by injecting a molten resin into a cavity formed between the fixed mold 101 and the movable mold 102. Clamping plates 101*a* and 102*a* are respectively fixed to the fixed mold 101 and the movable mold 102. The clamping plates 101*a* and 102*a* are used to lock the mold 100A/100B to a molding operation position 11 (mold clamping position) of the IMM2.

For the mold 100A/100B, a self-closing unit 103 is provided for maintaining a closed state between the fixed mold 101 and the movable mold 102. The self-closing unit 103 enables preventing the mold 100A/100B from opening after unloading the mold 100A/100B from the IMM2. The self-closing unit 103 maintains the mold 100A/100B in a closed state using a magnetic force. The self-closing unit 103 located at a plurality of locations along opposing surfaces of the fixed mold 101 and the movable mold 102. The self-closing unit 103 is a combination of an element on the side of the fixed mold 101 and an element on the side of the movable mold 102. For the self-closing unit 103, typically two or more pair are installed for one of the molds 100A and 100B.

A conveying device 3A loads and unloads the mold 100A onto/from the molding operation position 11 of the IMM2. A conveying device 3B loads and unloads the mold 100B onto/from the molding operation position 11. The conveying device 3A, the IMM2, and the conveying device 3B are arranged to be lined up in this order in the X-axis direction. In other words, the conveying device 3A and the conveying device 3B are arranged laterally with respect to the IMM2 to sandwich the IMM2 in the X-axis direction. The conveying devices 3A and 3B are arranged to face each other, and the conveying device 3A is arranged on one side laterally of the IMM2, and the conveying device 3B is arranged on the other side respectively adjacent. The molding operation position 11 is positioned between the conveying device 3A and the conveying device 3B. The conveying device 3A includes a frame 30A, a plurality of rollers 32, and a plurality of rollers 33. The conveying device 3B includes a frame 30B, a conveyance unit 31B, a plurality of rollers 32, and a plurality of rollers 33. A conveying device controller 42A controls the conveying device 3A and a conveying device controller 42B controls the conveying device 3B.

The controller 41 controls the IMM2, the controller 42A controls the conveyor device 3A, and the controller 42B controls the conveyor device 3B. Each of the controllers 41, 42A and 42B includes, for example, a processor such as a CPU, a RAM, a ROM, a storage device such as a hard disk, and interfaces connected to sensors or actuators (not illustrated). The processor executes programs stored in the storage device. An example of a program (control) that the controller 41 executes is described below. The controller 41 is communicably connected with the controllers 42A and 42B, and provides instructions related to the conveyance of the mold 100A/100B to the controllers 42A and 42B. The controllers 42A and 42B, if loading and unloading of the mold 100A/100B terminates, transmit a signal for operation completion to the controller 41. In addition, the controllers 42A and 42B transmit an emergency stop signal at a time of an abnormal occurrence to the controller 41

The frame 30A/30B is a skeleton of the conveying device 3A/3B, and supports the conveyance unit 31B, and the pluralities of rollers 32 and 33. The conveyance unit 31B is an apparatus that moves the mold 100A/100B back and forth in the X-axis direction, and that removes and inserts the mold 100A/100B in relation to the molding operation position 11. The conveyance unit 31B is controlled by the conveyance device controller 42B.

The plurality of rollers 32 configure a row of rollers arranged in the X-axis direction, where two rows are configured separated in the Y-axis direction. The plurality of rollers 32 rotate around the axis of revolution in the Z-axis direction, and guide movement in the X-axis direction of the mold 100A/100B contacting the side surfaces of the mold 100A/100B (the side surfaces of the clamping plates 101*a* and 102*a*) and supporting the mold 100A/100B from the side. The plurality rollers 33 configure a row of rollers arranged in the X-axis direction, where two rows are configured separated in the Y-axis direction. The plurality of rollers 33 rotate around the axis of revolution in the Y-axis direction, and cause movement in the X-axis direction of the mold 100A/100B to be smooth, supporting the bottom surfaces of the mold 100A/100B (the bottom surfaces of the clamping plates 101*a* and 102*a*) and supporting the mold 100A/100B from below.

Figure 4:
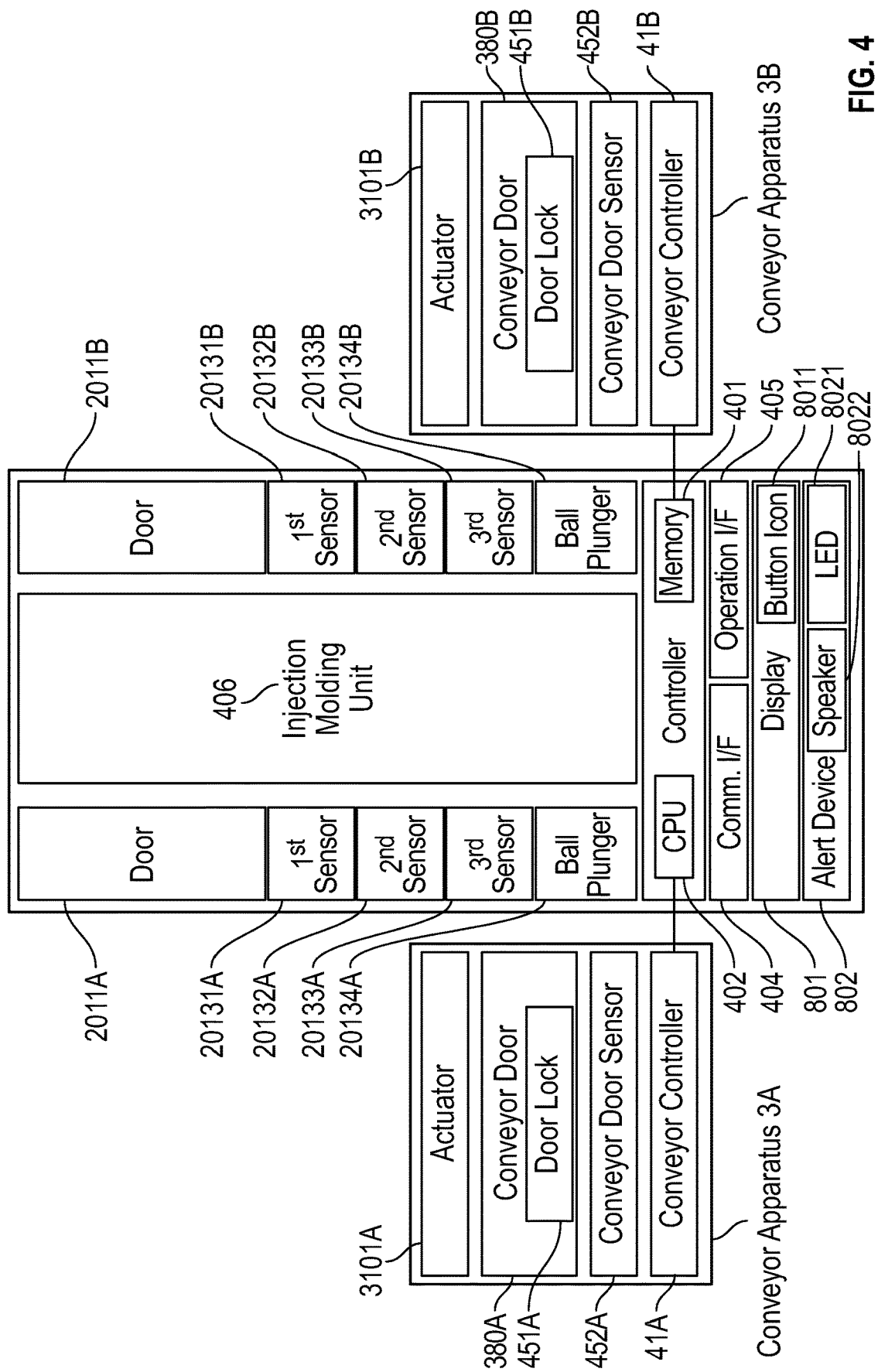
FIG. 4 is a block diagram illustrating components the injection molding system according to an exemplary embodiment.

FIG. 2 illustrates a side view of the IMM2. FIG. 3 illustrates an end view of a fixed platen 61, and a figure viewing from the arrow direction of the I-I line in FIG. 2. FIG. 4 illustrates a partial perspective view for describing the configuration of a periphery of the molding operation position 11.

With reference to FIG. 20 and FIG. 2, the IMM2 includes an injecting apparatus 5, a clamping apparatus 6, a take-out robot 7 for ejecting a molded part, and the controller 41. The injecting equipment 5 and the clamping device 6 are arranged on a frame 10 in the Y-axis direction.

The injecting apparatus 5 includes an injection cylinder 51 that is arranged to extend in the Y-axis direction. The injection cylinder 51 includes a heating device (not illustrated) such as a band heater, and melts a resin introduced from a hopper 53. A screw 51a is integrated into the injection cylinder 51, and by rotation of the screw 51a, plasticizing and measuring the resin introduced into the injection cylinder 51 are performed, and by movement in the axial direction (Y-axis direction) of the screw 51a, it is possible to inject a molten resin from an injection nozzle 52.

A shut-off nozzle that opens/closes a discharge port can be used as the nozzle 52. However, any mechanism that would enable implementation of the nozzle 52 function is applicable. In FIG. 2, an example of a shut-off nozzle is illustrated. For an opening/closing mechanism 56, a pin 56a for opening/closing the discharge port 52a is arranged. The pin 56a is connected with an actuator (a cylinder) 56c via a link 56b, and by the operation of the actuator 56c the discharge port 52a is opened and closed.

The injection cylinder 51 is supported by a driving unit 54. In the driving unit 54, a motor for plasticizing and measuring the resin by rotationally driving the screw 51a, and a motor for driving the screw 51a to move forward/backward in the axial direction are arranged. The driving unit 54 can move forward/backward in the Y-axis direction along a rail 12 on the frame 10. And, in the driving unit 54, an actuator (for example, an electrically driven cylinder) 55 for causing the injecting apparatus 5 to move forward/backward in the Y-axis direction is arranged.

The clamping apparatus 6 performs a clamping and opening and closing of the molds 100A/100B. In the clamping apparatus 6, the following are arranged in order in the Y-axis direction: the fixed platen 61, a movable platen 62, and a movable platen 63. Through platens 61 to 63, a plurality of tie-bars 64 pass. Each of the tie-bars 64 is an axis that extends in the Y-axis direction, one end of which is fixed to the fixed platen 61. Each of the tie-bars 64 is inserted into a respective through hole formed in the movable platen 62. The other end of each of the tie-bars 64 is fixed to the movable platen 63 through an adjusting mechanism 67. The movable platens 62 and 63 can move in the Y-axis direction along a rail 13 on the frame 10, and the fixed platen 61 is fixed to the frame 10.

A toggle mechanism 65 is arranged between the movable platen 62 and the movable platen 63. The toggle mechanism 65 causes the movable platen 62 to move forward/backward in the Y-axis direction in relation to the movable platen 63 (in other words, in relation to the fixed platen 61). The toggle mechanism 65 includes links 65a to 65c. The link 65a is connected rotatably to the movable platen 62. The link 65b is pivotably connected to the movable platen 63. The link 65a and the link 65b are pivotably connected to each other. The link 65c and the link 65b are pivotably connected to each other. The link 65c is pivotably connected to an arm 66c.

The arm 66c is fixed on a ball nut 66b. The ball nut 66b engages a ball screw shaft 66a that extends in the Y-axis direction, and moves forward/backward in the Y-axis direction by rotation of the ball screw shaft 66a. The ball screw shaft 66a is supported such that it is free to rotate by the movable platen 63, and a motor 66 is supported by the movable platen 63. The motor 66 rotationally drives the ball screw shaft 66a while the rotation amount of the motor 66 is detected. Driving the motor 66 while detecting the rotation amount of the motor 66 enables clamping, opening, and closing of the mold 100A/100B.

The IMM2 includes sensors 68 for measuring a clamping force, where each sensor 68 is, for example, a strain gauge provided on the tie-bar 64, and calculates a clamping force by detecting a distortion of the tie-bar 64.

The adjusting mechanism 67 includes nuts 67b supported to freely rotate on the movable platen 63, motors 67a as driving sources, and transfer mechanisms for transferring the driving force of the motors 67a to the nuts 67b. Each of the tie-bars 64 passes through a hole formed in the movable platen 63, and engages with the nut 67b. By causing the nuts 67b to rotate, the engagement positions in the Y-axis direction between the nuts 67b and the tie-bars 64 change. That is, the position at which the movable platen 63 is fixed in relation to the tie-bar 64 changes. With this, it is possible to cause a space between the movable platen 63 and the fixed platen 61 to change, and thereby it is possible to adjust a clamping force or the like.

The molding operation position 11 is a region between the fixed platen 61 and the movable platen 62. The mold 100A/100B introduced into the molding operation position 11 are sandwiched between the fixed platen 61 and the movable platen 62 and thereby clamped. Opening and closing in based on movement of the movable mold 102 by movement of the movable platen 62 is performed.

The take-out robot 7 illustrated in FIG. 2 will now be described. The take-out robot 7 includes a rail 71 that extends in the X-axis direction, and a movable rail 72 that can move in the X-axis direction on the rail 71. The movable rail 72 is arranged to extend in the Y-axis direction, and a slider 73 is arranged on the movable rail 72. The slider 73 moves in the Y-axis direction guided by the movable rail 72, and moves up and down an elevating shaft 73a in the Z-axis direction. On a lower end of the elevating shaft 73a, a vacuum head 74 is arranged, and on the vacuum head 74, a chuck plate 75 specialized to a molded part is mounted.

The take-out robot 7, after opening, moves the vacuum head 74 between the stationary mold 101 and the movable mold 102 as illustrated by broken lines in FIG. 2 by the rail 71, the movable rail 7, and the slider 73, sticks to the molded part, and conveys it outside the mold 100A/100B.

FIG. 3 illustrates an opening portion 61a in a central portion of the fixed platen 61 through which the nozzle 52 moves forward/backward. To the surface on the side of the movable platen 62 (called an inner surface) of the fixed platen 61 a plurality of rollers BR are supported such that they are free to rotate. The plurality of rollers BR rotate around the axis of revolution in the Y-axis direction, and cause movement in the X-axis direction of the mold 100A/100B to be smooth, supporting the bottom surfaces (the bottom surface of the clamping plate 101a) of the mold 100A/100B and supporting the mold 100A/100B from below. On both sides in the X-axis direction of the fixed platen 61, a roller supporting body 620 is fixed, and the plurality of rollers BR are supported by the roller supporting body 620.

On the inner surface of the fixed platen 61, grooves 61b that extend in the X-axis direction are formed. The grooves 61b are formed in two rows separated vertically. On each of the grooves 61b a roller unit 640 is arranged. For the roller unit 640, a plurality of rollers SR are supported such that they are free to rotate. The plurality of rollers SR rotate around the axis of revolution in the Z-axis direction, and guide movement in the X-axis direction of the mold 100A/

100B contacting the outer surfaces of the mold 100A/100B (the outer surface of the clamping plate 101a) and supporting the mold 100A/100B from the side. As illustrated in the cross sectional view of the line II-II, while the roller unit 640, by a bias of a spring 641, is positioned at a position at which the roller SR protrudes from the groove 61b, at a time of clamping it is retracted in the groove 61b, and positioned at a position at which the roller SR does not protrude from the groove 61b. The roller unit 640 can prevent the inner surfaces of the mold 100A/100B and the fixed platen 61 from contacting and damaging the inner surfaces at a time of alternating the mold 100A/100B, and the roller unit 640 does not impede the inner surface of the fixed platen 61 and the mold 100A/100B being closed at a time of clamping.

On both sides in the X-axis direction of the fixed platen 61, a roller supporting body 630 is fixed, and a plurality of rollers SR are supported by the roller supporting body 630.

On the fixed platen 61, a plurality of fixing mechanisms (clamps) 610 are arranged for fixing the fixed mold 101 to the fixed platen 61. Each fixing mechanism 610 includes an engaging portion 610a that engages with the clamping plate 101a, and a built-in actuator (not illustrated) that moves the engaging portion 610a between an engagement position and an engagement release position.

Note that for the movable platen 62, similarly to the fixed platen 61, a plurality of rollers BR, the roller supporting bodies 620 and 630, the roller unit 640, and the fixing mechanism 610 for fixing the movable mold 102 are arranged.

Figure 18:
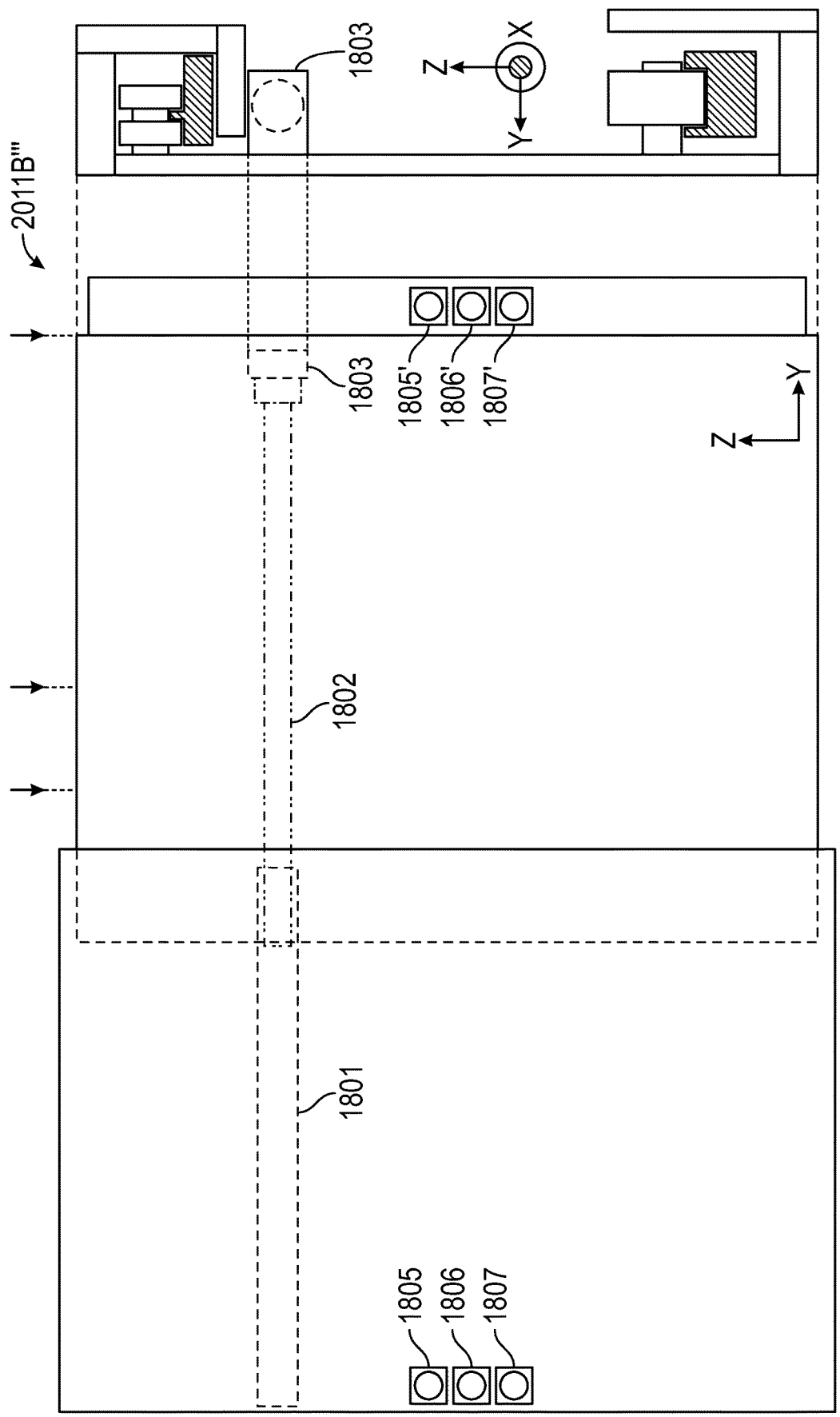
FIG. 18 is a side view and the cross sectional view of a door of the injection molding machine according to another exemplary embodiment

FIG. 1 illustrates a configuration according to an exemplary embodiment of the present disclosure and provides an improvement over the configuration illustrated in FIG. 18. As illustrated in FIG. 1, in the present embodiment, the conveyance unit 31 includes an actuator 3101 that is an electrically driven cylinder with a motor as a driving source, and a rod 3102 that is moved forward/backward by the actuator 3101. The actuator 3101 is fixed to a supporting plate (not illustrated), which is fixed to a frame 30. A fixed mold 10101 is fixed to the distal end of the rod 3102. In the present embodiment, both a fluid actuator and an electric actuator can be used as the actuator 3101. Using an electric actuator, enables improving the precision of control of the position or the speed when conveying the mold 100A/100B.

As illustrated in FIG. 1, the IMM2 includes, on the frame 10 of the IMM2, a door structure facing the conveyor apparatus 3A and a door structure facing the conveyor apparatus 3B. The door structure includes a slidable IMM2 door 2011A/B, a door rail 2012A/B along which the door 2011A/B moves, and a set of sensors (not illustrated) configured to detect the position of the door 2011A/B. The door structure provides operators access to the IMM2 when the door 2011A/2011B is opened. The side surface 2016 A/B of the IMM2 includes an opening 2015A/B through which the mold 100A/B is inserted and ejected. The opening 2015A/B is at least partially exposed when the IMM2 door 2011A/B is opened. The opening 2015A/B is closed off when the IMM2 door 2011A/B is closed.

The IMM2 doors 2011A and 2011B, and the door rails 2012A and 2012B are partially covered by an IMM2 cover 60 when the IMM2 doors 2011A and 2011B are fully opened. The IMM2 doors 2011A and 2011B and the IMM2 cover 60 are configured to enclose fixed platen 61, moveable platen 62, and the clamping apparatus 6 for safety purposes when the IMM2 doors 2011A and 2011B are closed. The detailed structure and function of the door structure is described below with respect to FIGS. 7, 8A, and 8B.

In the present embodiment, since the conveyance unit 31A/B is fixed to the mold 100A/100B, at least one of the doors 2011A/2011B is kept open where at least one of the conveyance units 31A or 31B is used and injection molding is performed. In order to provide operators' safety during the injection molding, the IMM2 cover 60, the IMM2 doors 2011A and 2011B, the conveyor covers 370A and 370B, and the conveyor doors 370A and 370B encloses the conveyor apparatuses 3A and 3B and the IMM2. As illustrated in FIG. 1, even in a case where the IMM doors 2011A and 2011B are partially opened or only partially closed, if the conveyor doors 370A and 370B are closed, an operator's access to the conveyor apparatuses 3A and 3B and to structures inside the IMM2 is safely blocked. Therefore, under this situation, the injection molding can be continued, even if the IMM doors 2011A and 2011B are partially opened.

FIG. 4 is a block diagram illustrating components of the injection molding system 1 of the present disclosure which provides improvements on components illustrated in FIG. 1. Descriptions may be omitted for some components that have been described above. The injecting apparatus 5, the clamping apparatus 6, and the take-out robot 7 are collectively referred to as an injection molding unit 406.

The IMM2 includes first sensor 20131A, second sensor 20132A, third sensor 20133A, and a ball plunger 20134A for the IMM2 door 2011A. The IMM2 also includes first sensor 20131B, second sensor 20132B, third sensor 20133B, and a ball plunger 20134B for the IMM2 door 2011B. The first sensor 20131A/B is configured to detect if the IMM2 door 2011A/B is located at a first position where the IMM2 door 2011A/B is fully opened. The second sensor 20132A/B is configured to detect if the IMM2 door 2011A/B is located at a second position where the IMM2 door 2011A/B is substantially closed. The third sensor 20133A/B is configured to detect if the IMM2 door 2011A/B is located at a third position where the IMM2 door 2011A/B is partially opened and partially closed. The IMM2 door 2011A/B at the third position and the door rail 2012A/B define an opening connecting an area between two platens 61 and 62, and an area surrounded by the conveyor cover 370A/B. The third position can be defined as a position where the IMM2 door 2011A/B is supposed to be located when the injection molding is performed.

The ball plunger 20134A/B is configured to detect whether the IMM2 door 2011A/B is moved out of the third position. The ball plunger 20134A/B applies a force to the IMM2 door 2011A/B so that the IMM2 door 2011A/B does not move. If a force greater than a threshold amount is applied to the IMM2 door 2011A/B, a ball of the ball plunger 20134A/B can yield to the pressure. In the present embodiment, the third sensor 20133A/B is configured to detect if the position of the IMM2 door 2011A/B moves by detecting if the ball yields. A description of this process is provided below with respect to FIG. 7.

The first sensor 20131A/B, second sensor 20132A/B, and third sensor 20133A/B are connected to and provide signals to the controller 4. If injection molding is being performed, the controller 4 immediately stops the injection molding in response to the controller 4 detecting the IMM2 door 2011A/B is moved out of the third position. This enables operators to avoid being hit by the moving platen 62. The details of this process and other processes related to the IMM2 door 2011A/B are described below with reference to FIGS. 12-14.

The controller 4 controls the injection molding systems 1. The controller 4 includes, for example, one or more processors 402 such as a CPU, a RAM, a ROM, a memory 401 such as a hard disk, and interfaces connected to components of the IMM2. The processor 402 executes computer programs stored in the memory 401 by loading instructions in the computer programs onto the RAM and executing the instructions to perform control processes of the injection molding system 1. The details of the computer programs and the control processes are described with reference to FIGS. 12-14. In another exemplary embodiment, functions of the controller 4 can be executed by multiple controllers. For example, the functions of the controller 4 can be distributed to the controller 4, the controller 41A, and the controller 41B.

The IMM 2 includes a display unit 801 and an alert device 802 fixed to the frame 10. The display unit 801 is connected to the controller 4 and displays various information of the injection molding system 1, based on the instruction of the controller 4. In the present embodiment, the display is a touch panel display. The display unit 801 displays icons 8011 that can be selected, and in response to a selection, the display controller 4 receives inputs and executes various functions.

The alert device 802 includes a set of LEDs 8021 and a speaker 8022 to notify operators of events or errors that occurred in the injection molding system 1 based on instructions from the controller 4. In another exemplary embodiment, the alert device 802 can include a buzzer in addition to the LEDs 8021 and speaker 8022.

In the present embodiment, the alert device 802 is located next to the display 801 as illustrated in FIG. 1, but can be placed on the top surface of the conveyor cover 370A/B. In another exemplary embodiment, both conveyor 3A and 3B include an alert device 802 on a top surface of the conveyor cover 370A/B. In another exemplary embodiment, the display 801 can function as an alert device by displaying alert messages and/or icons.

The controller 4 connects to a communication I/F 404 and an operation I/F 405, which are included in the IMM2. The communication I/F 404 is, for example, an Ethernet connector or USB connector for communicating with external apparatuses. The operation I/F 405 is a connector connecting to an operational unit. In the present embodiment, a touch panel module of the display 801 is connected to the controller 4 via the operation I/F 405. The controller 4 is communicably connected with conveyor controllers 41A and 41B, via which the controller 4 controls the conveyor apparatuses 3A and 3B respectively.

The conveyor apparatus 3A/3B includes an actuator 3101A/B, a door lock 451A/B, and conveyor door sensor 452A/B that are connected to and are controlled by the controller 4. The door lock 451A/B is an electronic door lock which electronically locks and unlocks the conveyor door 380A/B, upon instruction signals from the conveyor controller 41A/B. The actuator 3101A/B, the door lock 451A/B, and the conveyor door sensor 452A/B provide status information of their respective status to the conveyor controller 41A/B. The conveyor controller 41A/41B provides the received status information to the controller 4.

The controller 4 issues instructions to insert or eject the molds 100A and 100B into or from the IMM2. When insertion or ejection of a mold 100A/100B is completed, the conveyor apparatuses 3A/3B notifies the controller 41A/41B that the insertion/ejection operation is completed. The conveyor controller 41A/41B also transmits an emergency stop signal to the controller 4 if an error/abnormal condition is detected.

In another exemplary embodiment, in addition to the above-described components, the IMM2 can include one or more sensors configured to detect the position of a mold within the IMM2.

As conveyor cover 370A and the conveyor doors 380A enclose the conveyor apparatus 3A, when the mold 100A connected to the conveyance unit 31A is not inserted into the IMM2. Also, the conveyor cover 370B and the conveyor doors 380B enclose the conveyor apparatus 3B, when the mold 100B connected to the conveyance unit 31B is not inserted into the IMM2. The conveyor cover 370A/B and the conveyor door 380A/B are fixed on the supporting plate 360 and the frame 30. Alternatively, the conveyor cover 370A/B and the conveyor doors 380A/B can be fixed onto the ground where the IMM2 is placed. The conveyor cover 370A/B includes a frame and a transparent glass wall through which operators can see conveyor apparatus 3A/3B and the mold inside the cover 370A/B. Each of the conveyor doors 380A/B include a transparent glass panel, a door frame that fixes the glass panel, and a hinge fixed to the door frame and the conveyor cover 380A/B. One of the conveyor door 380A/B is placed on a side of the conveyance unit 31A/B along a longitudinal direction, and another of the conveyance doors 380A/B is placed on other side of the conveyance unit 31A/B along the longitudinal direction.

The conveyor cover 370A/B and the conveyor doors 380A/B can have various heights to avoid operators from touching the conveyor apparatus 3A/3B inside the conveyor cover 370A/B.

In another exemplary embodiment, at least one of the conveyor doors 380A/B can be a slidable door that slides along the conveyor cover 370A/B.

The conveyor apparatus 3A/3B is fixed to the IMM 2 via a fixture, but a side plane of the conveyor apparatus 3A/B facing the IMM 2 is slightly separated from the IMM2. This reduces force or vibration applied from the IMM2 to the conveyor apparatus 3A/3B.

Figure 5:
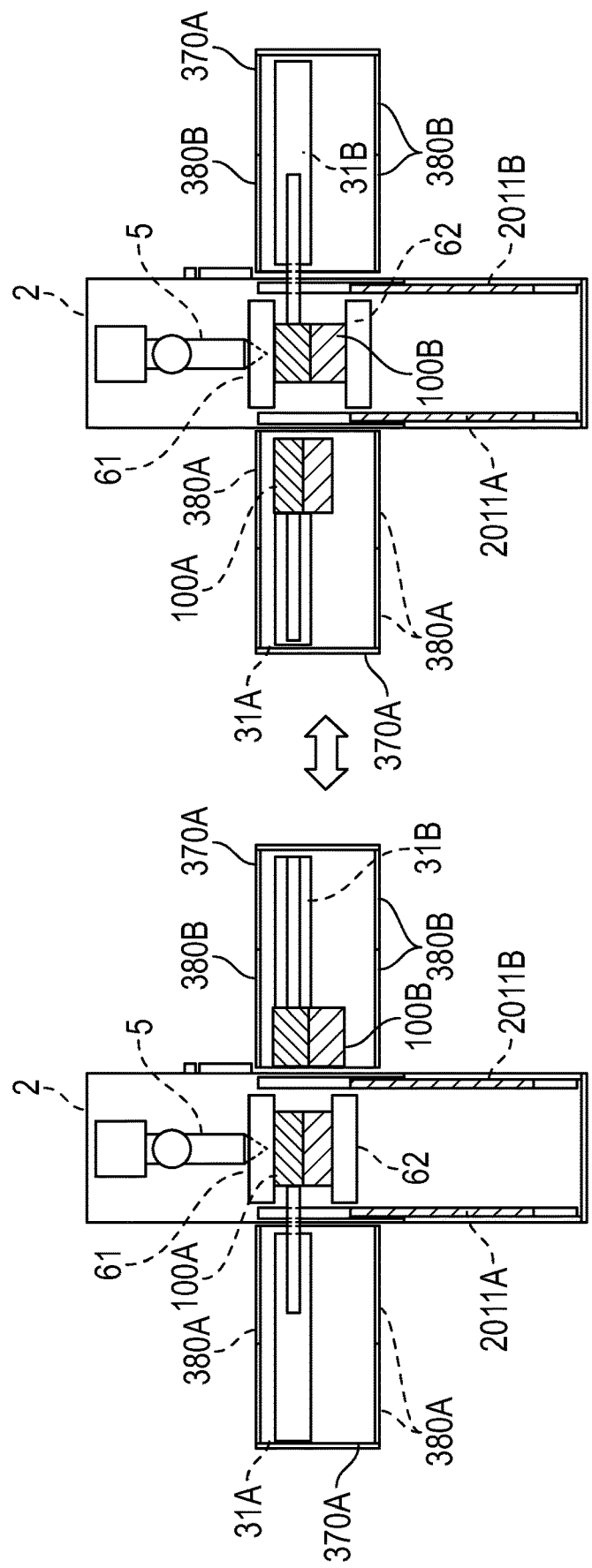
FIG. 5 illustrates an operation mode of the injection molding system according to an exemplary embodiment.
Figure 6:
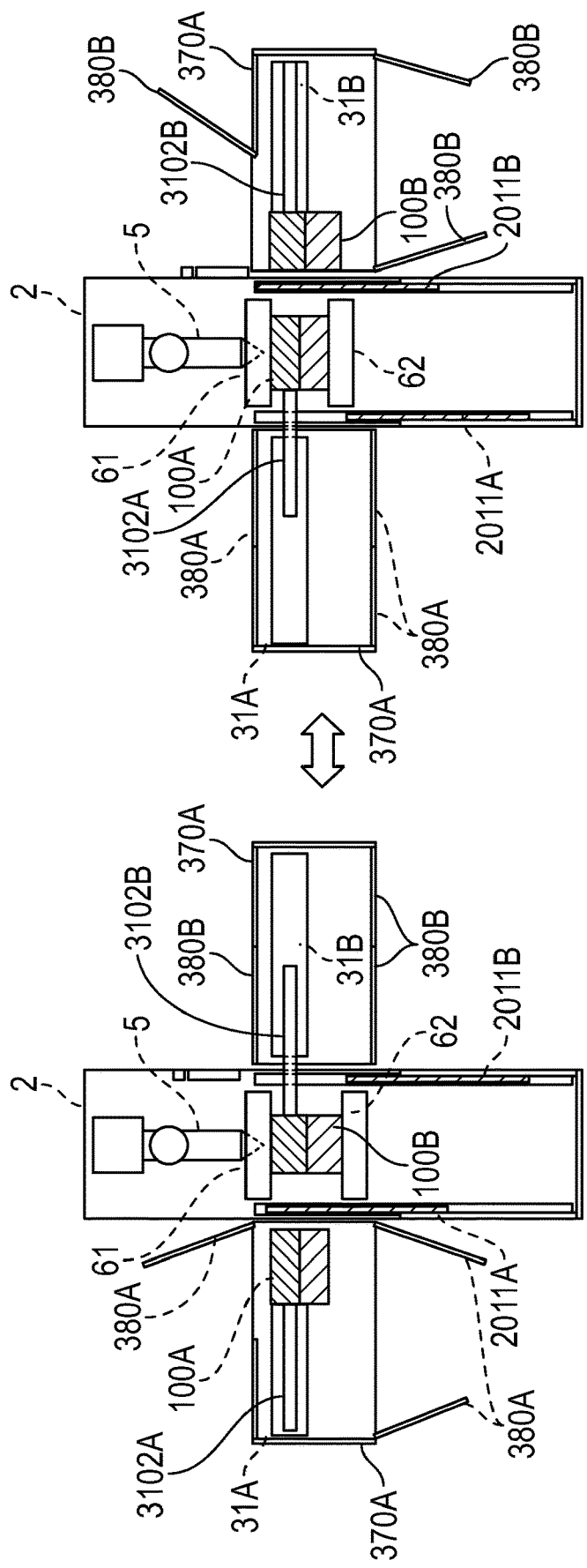
FIG. 6 illustrates another operation mode of the injection molding system according to an exemplary embodiment.

FIGS. 5 and 6 illustrates operation modes of the injection molding system 1. While FIGS. 5 and 6 illustrate some components of the injection molding system 1, not all components are illustrated. In the present embodiment, there are three operation modes associated with injection molding.

Operation Mode 1

FIG. 5 illustrates Operation Mode 1. More specifically, Operation Mode 1 is where cooling of one mold is performed outside the IMM2 on the conveyor apparatus 3A/3B. While cooling of the mold, other processes of the another mold are performed inside the IMM2. This improves utilization efficiency of the IMM2 compared to, for example, a normal injection molding mode (mode 3), where cooling of one mold is performed inside the IMM2 in the position between the platens 61 and 62.

As illustrated in the figure on the left side of FIG. 5, the mold 100A is located inside the IMM2. In this situation, resin or other material has been injected into the cavity of the mold 100A, and cooling of the mold 100A is completed. The mold 100B is located on the conveyor apparatus 3B, outside the IMM2. In this situation the resin or other material has been injected into the cavity of the mold 100B, and the mold still needs to be cooled. The mold 100B is being cooled on the conveyor apparatus 3B outside the IMM2.

The mold 100A is clamped by the platens 61 and 62, opened by the clamping apparatus 6 by moving the movable platen 62 away from the mold 100A, and the molded part is removed from the mold 100A by the take-out robot 7. Then the mold 100A is closed by the clamping apparatus 6 by moving the movable platen 62 towards the mold 100A, resin or other material is injected into the cavity of the mold 100A from the injecting apparatus 5, and the pressure in the cavity of the mold 100A is then held for a predetermined time period. Then, clamping of the mold 100A with the platens 61 and 62 is released by disengaging the clamp 610 of the fixed platen 61 from the fixed mold 10101A and by disengaging the clamp 610 of the movable platen 62 from the movable mold 10102A.

The process then proceeds to changing the mold inside the IMM2. The conveyance unit 31A ejects the mold 100A to the conveyor apparatus 3A, and the conveyance unit 31B inserts the mold 100B from the conveyor apparatus 3B. The injection molding process continues for both the mold 100A and the mold 100B. The controller 4 automatically beings the changing of the mold in the IMM2 without any user inputs in response to completion of prior processes necessary to start the changing of the mold. Also, in response to completion of the change of the mold in the IMM2, the following processes are automatically started by the controller 4, without any user inputs: cooling process of the mold 100A while the mold 100A is being ejected from the IMM2, and cooling process of the mold 100B while the mold 100B is being inserted into the IMM2. Therefore, the process of changing the mold can be started even before the cooling of the mold 100B is completed.

As illustrated in the figure on the right side of FIG. 5, a similar process as described above for the mold 100B is performed for the mold 100A and a similar processes as described above for the mold 100A is performed for the mold 100B. The mold 100A is being cooled on the conveyor apparatus 3A outside the IMM2.

The mold 100B is clamped by the platens 61 and 62, opened by the clamping apparatus 6 by moving the movable platen 62 away from the mold 100B, and the molded part is removed from the mold 100B by the take-out robot 7. Then the mold 100B is closed by the clamping apparatus 6 by moving the movable platen 62 towards the mold 100B, resin or other material is injected into the cavity of the mold 100B from the injecting apparatus 5, and the pressure in the cavity of the mold 100B is then held for a predetermined time period. Then, clamping of the mold 100B with the platens 61 and 62 is released by disengaging the clamp 610 of the fixed platen 61 from the fixed mold 10101B and by disengaging the clamp 610 of the movable platen 62 from the movable mold 10102B.

After the mold 100B is released, the process proceeds to changing the mold inside the IMM2. The conveyance unit 31B ejects the mold 100B to the conveyor apparatus 3B, and the conveyance unit 31A inserts the mold 100A from the conveyor apparatus 3A. The injection molding process continues for both the mold 100A and the mold 100B. In the present embodiment, a cooling process of the mold 100B is performed while the mold 100B is being ejected from the IMM2, while a cooling process of the mold 100A is performed while the mold 100A is being inserted into the IMM2. Therefore, the process of changing a mold can be started even before the cooling of a mold is completed.

The above-described processes are repeated, as illustrated in the figure on the left side of FIG. 5 and the figure on the right side of FIG. 5. Once the injection molding begins, the injection molding system 1 automatically continues performing injection molding with two molds and does not stop until either unit an error or abnormal situation occurs or a user intentionally stops the injection molding process. In another exemplary embodiment, cooling of one mold can occur in a situation where the mold is partially inside the IMM2.

In order to best utilize IMM2, the mold is not located outside a region between the fixed platen 61 and the moveable platen 62. However, the mold does not need to be completely outside the IMM2. In Operation Mode 1, one mold is being cooled while the mold is not clamped by the platen 62, and at least a part of a cooling process of the mold and at least a part of processes of injection molding with another mold are performed in parallel, concurrently, or simultaneously.

At the beginning of Operation Mold 1, in a case where the mold 100A is the first mold inserted into the IMM2 and the mold 100B is the next mold inserted, the cavity of mold 100A does not contain any material. The process begins with clamping the mold 100A, followed by the start of injecting material into the cavity of the mold 100A without performing a process of opening, taking out, and closing the mold 100A. The mold 100A is then ejected and the mold 100B inserted. The above-described process then repeats for mold 100B.

At the end of Operation Mole 1, at a final cycle of injection molding for a mold 100A/10)B, the IMM2 performs closes the mold 100A/100B, releases the mold 100A/100B, where injecting of a material and holding of the mold pressure are not performed.

As illustrated in FIG. 5, Operation Mode 1 is performed, the IMM2 doors 2011A and 2011B are opened at the third position, because the molds 100A and 100B are frequently and repeatedly inserted and ejected. In order to assure operator safety, the conveyor doors 380A and 380B are kept closed so that the cover 60, IMM2 doors 2011A and 2011B, conveyor covers 370A and 370B, and conveyor doors 380A and 380B surround the inner region of the IMM2 and the moving molds. This prevents operators from getting near from the inner region of the IMM2 and the moving molds.

If the controller 4 detects that at least one of the IMM2 door 2011A, the IMM2 door 2011B, the conveyor door 380A, or the conveyor door 380B moves, the controller 4 immediately stops the injection molding process in the IMM2. The conveyor doors 380A and 380B are locked by the door lock 451A and 451B, and if the doors are unlocked by, for example, user input, the controller 4 can be configured to stop the injection molding.

Operation Mode 2

FIG. 6 illustrates Operation Mode 2 according to the exemplary embodiment and provides an improvement over elements illustrated in FIG. 20. As described above, the conveyor apparatus 3A/3B is used for inserting and ejecting the mold 100A/100B. While injection molding is performed with one mold in the IMM 2, another mold is unloaded from a conveyor apparatus and a new mold is loaded onto the conveyor apparatus and set up for injection molding by connecting the mold to the actuator 3101A/3101B or connecting hoses (no illustrated) to the mold 100A/100B for temperature control. Operation Mode 2 enables operators to set up molds on both sides of the IMM 2 and can be utilized in a situation requiring relatively frequent mold changes.

As illustrated in the figure on the left side of FIG. 6, the mold 100B is located between the fixed platen 61 and moveable platen 62 in the IMM2. The mold 100A, having been ejected from the IMM2, is located on the conveyor apparatus 3A.

In the IMM2, injection molding is performed with the mold 100B, which includes: clamping the mold 100B, closing the mold 100B, injecting material into a cavity of the mold 100B, maintaining a pressure inside the mold 100B, cooling the mold 100B, opening the mold 100B, and ejecting a molded part from the mold 100B. These steps are performed in the described order and define one cycle of injection molding. The IMM2 repeats the cycle a predetermined number of times.

Operators set up a new mold on the conveyor apparatus 3A. As part of the set up process, operators close the IMM2 door 2011A, open the conveyor door 380A, unload the mold 100A from the conveyor apparatus 3A, and load a new mold 100A onto the conveyor 3A. The controller 4 can unlock the conveyor door 380A in response to detection of closing of the door or detection that the conveyor door 380A is at the second position in a case where the mold 100A is detected on the conveyor 3A. The controller 4 utilizes the state of the actuator 3101A or information on the position of the mold 100A to detect if the mold 100A is on the conveyor 3A.

Operators connect cables (not illustrated) providing electricity to the mold 100A and connect hoses (not illustrated) that provide a liquid to control the mold's 100A temperature. Operators can begin providing the liquid to the mold 100A to start raising the temperature of the mold 100A to prepare for the injection molding. When the setup of the new mold 100A is completed, operators close the conveyor door 380A and wait for the completion of the injection molding with the mold 100B by the IMM2.

As illustrated in the figure on the left side of FIG. 6, the IMM2 door 2011B is kept partially open at the third position because a rod 3102B of the conveyance unit 31B attached to the mold 100B in the IMM2 and the rod 3102B that runs from outside the IMM2 to inside the IMM2. The IMM2 door 2011B is located such that it does not collide with the rod 3102B. Since the movable platen 62 is moving during the injection molding, the door 2011B is partially closed to avoid operators from being hit by the moving platen 62.

The IMM2 door 2011A is closed, which enables operators to safely access the mold 100A or set up a new mold on the conveyor apparatus 3A. Because the IMM2 door 2011B is partially opened, the controller 4 locks the conveyor door 380B, and the operators cannot access the inside of the IMM2 via the conveyor 3B area. Because the IMM2 door 2011A is closed, the controller 4 unlocks the conveyor door 380A, which enables operators to access the conveyor 3A area and are able to setup a new mold on the conveyor 3A.

When the predetermined number of cycles are completed, injection molding with the mold 100B is finished. Next, the mold in the IMM2 is changed. First the operators open the IMM door 2011B and initiate ejection of the mold 100B with the actuator 3101B onto the conveyance unit 31B. The operators then close the IMM2 door 2011B. After ejection of the mold 100B, insertion of the mold 100A into the IMM2 is initiated. The operators open the IMM2 door 2011A and initiate insertion of the mold 100A with the actuator 3101A via the conveyance unit 31A.

Upon completion of the mold change, injection molding with the mold 100A is started, as illustrated in the figure on the right side of the FIG. 6.

In the IMM2, injection molding is performed with the mold 100A, which includes: clamping the mold 100A, closing the mold 100A, injecting material into a cavity of the mold 100A, maintaining a pressure inside the mold 100A, cooling the mold 100A, opening the mold 100A, and ejecting a molded part from the mold 100A. These steps are performed in the described order and defines one cycle of injection molding. The IMM2 repeats the cycle a predetermined number of times.

Operators set up a new mold on the conveyor apparatus 3B. As part of the set up process, operators close the IMM2 door 2011B, open the conveyor doors 380B, unload the mold 100B from the conveyor apparatus 3B, and load a new mold 100B onto the conveyor 3B. The controller 4 can unlock the conveyor door 380B in response to detection of closing of the door or detection that the conveyor door 380B is at the second position in a case where the mold 100B is detected on the conveyor 3B. The controller 4 utilizes the state of the actuator 3101B or information on the position of the mold 100B to detect if the mold 100B is on the conveyor 3B.

Operators connect cables (not illustrated) providing electricity to the mold 100B and connect hoses (not illustrated) that provide a liquid to control the mold's 100B temperature. Operators can begin providing the liquid to the mold 100B to start raising the temperature of the mold 100B to prepare for the injection molding. When the setup of the new mold 100B is completed, the operators close the conveyor door 380B, and wait for the completion of the injection molding with the mold 100A in the IMM2.

As illustrated in the figure on the right side of FIG. 6, the IMM2 door 2011A is kept partially open at the third position because a rod 3102A of the conveyance unit 31A attached to the mold 100A in the IMM2, and the rod 3102A that runs from outside the IMM 2 to inside the IMM2. The IMM door 2011A should be located not to collide with the rod 3102A. Since the movable platen 62 is moving during the injection molding, the IMM2 door 2011A is partially closed to avoid operators from being hit by the moving platen 62.

The IMM2 door 2011B is closed, which enables operators to safely access the mold 100B or set up a new mold on the conveyor apparatus 3B. Because the IMM2 door 2011A is partially opened, the controller 4 locks the conveyor door 380A, and the operators cannot access the inside of the IMM2 via the conveyor 3A area. Because the IMM2 door 2011B is closed, the controller 4 unlocks the conveyor door 380B, which enables operators to access the conveyor 3B area and are able to setup a new mold on the conveyor 3B.

When the predetermined number of cycles are completed, injection molding with the mold 100A is finished. Next, the mold in the IMM2 is changed. First the operators open the IMM2 door 2011A and initiate ejection of the mold 100A with the actuator 3101A onto the conveyance unit 31A. The operators then close the IMM2 door 2011A. After ejection of the mold 100A, insertion of the mold 100B into the IMM2 is initiated. The operators open the IMM2 door 2011B and initiate insertion of the mold 100B with the actuator 3101B via the conveyance unit 31B

Upon completion of the mold change, injection molding with the mold 100A is started again, as illustrated by the figure on the left side of the FIG. 6.

At the beginning of Operation Mode 2, if the mold 100B is set up and first inserted into the IMM2 as illustrated by the figure on the left side of FIG. 6, operators set up the mold 100A on the conveyor 3A without unloading a mold. At the end of Operation Mode 2, if the mold 100A is the last mold, the mold 100B is unloaded from the conveyor apparatus 3B and no mold is newly set up on the conveyor 3B. After completing injection molding with the mold 100B, the mold 100B is ejected from the IMM2 and unloaded from the conveyor 3B. No mold is inserted from the conveyor 3As side.

Operation Mode 3

Operation Mode 3, the conveyor apparatuses 3A and 3B are not used for the insertion/ejection of the mold 100A/100B. In other words, normal injection molding is performed without conveyor apparatuses. In place of conveyor apparatuses, tables, guide rails, etc. can be used to convey the mold 100A/100B. Operation Mode 3 can be selected in situations where conveyor apparatuses cannot be used. For example, where a special mold is used that is not compatible with the conveyor apparatuses, or where the conveyor apparatuses are broken and/or require maintenance.

Figure 7:
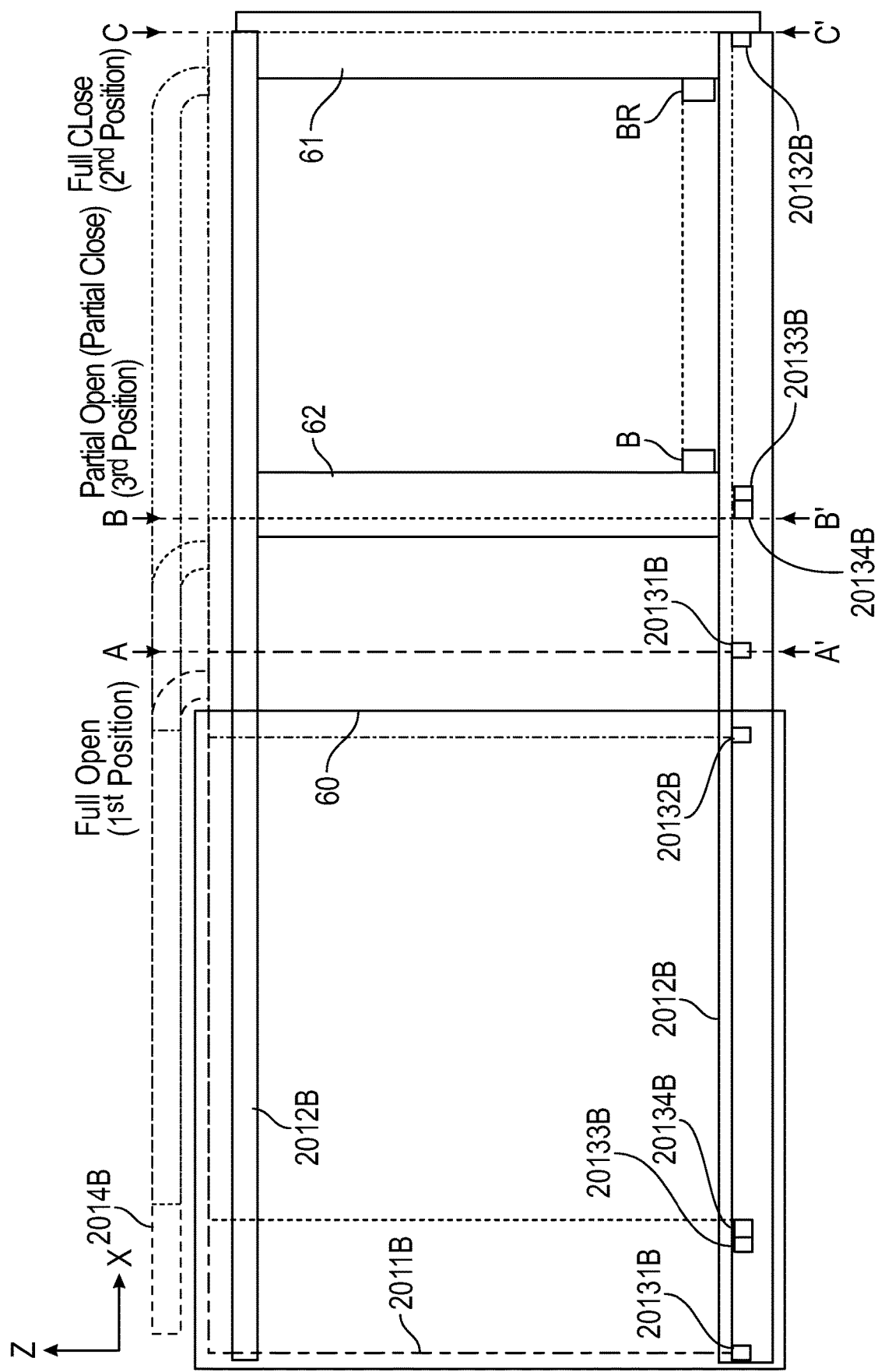
FIG. 7 is a side view of a door of the injection molding machine according to an exemplary embodiment.
Figures 8A, 8B:
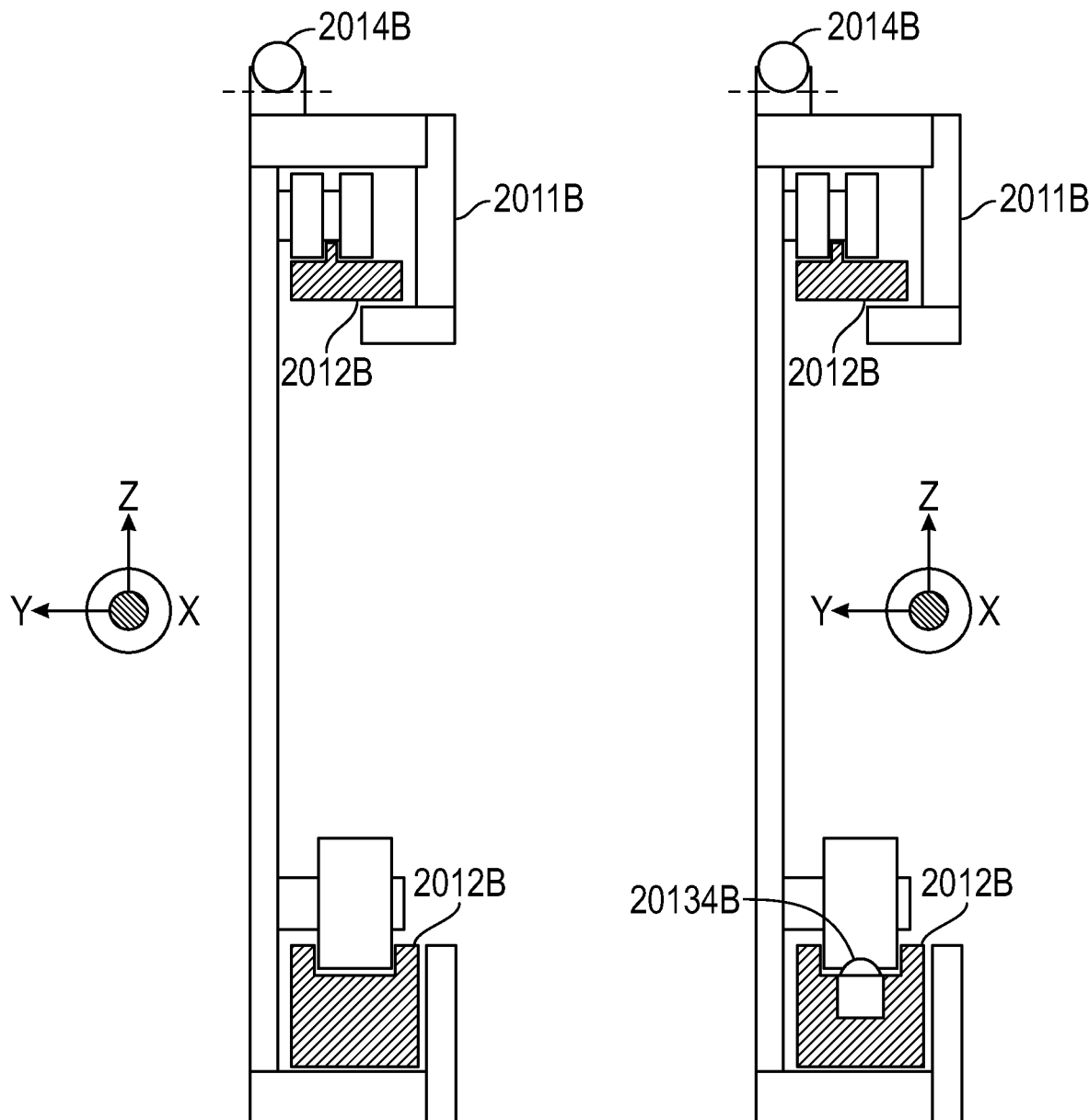
FIG. 8A is a cross sectional view of a door of the injection molding machine according to an exemplary embodiment.
FIG. 8B is another cross sectional view of a door of the injection molding machine according to an exemplary embodiment.

FIGS. 7, 8A, and 8B illustrate a configuration of IMM2 door 2011B.

FIG. 7 illustrates a side view of the IMM2 door 2011B at the first position, the second position, and the third position according to an exemplary embodiment. In FIG. 7 the cover 60, the door rail 2012B, the first sensor 20131B, the second sensor 20132B, and the third sensor 20133B, the ball plunger 20134B, the fixed platen 61, the movable platen 62, and rollers BR in the IMM2 are illustrated with solid lines. The IMM2 door 2011B at the first position is illustrated with dotted lines, the IMM2 door 2011B at the second position is illustrated with dashed lines, and the IMM2 door 2011B at the third position is illustrated with dot-dash lines. The arrow A indicates a position of the distal end of the IMM door 2011B when the IMM door 2011B is at the first position, the arrow C indicates a position of the distal end of the IMM door 2011B when the IMM door 2011B is at the second position, and the arrow B indicates a position of the distal end of the IMM door 2011B when the IMM door 2011B is at the third position.

When the IMM2 door 2011B is at the first position, the IMM2 door 2011B is fully opened, and the proximal end of the IMM2 door 2011B is at the most proximal position on the door rail 2012B. In this state, the operators have access to a region in the clamping apparatus 6, including a region between the moveable platen 62 and the moveable platen 63, and a region between the fixed platen 61 and the moveable platen 62.

When the IMM2 door 2011B is at the second position, the IMM2 door 2011B is fully closed, and the distal end of the IMM2 door 2011B is at the most distal position on the door rail 2012B. In this state, the IMM2 door 2011B blocks operators' access to the inner region of the IMM2. In this state, the IMM2 door 2011B does not need to completely closed, and there can be gaps small enough to preclude operators from inserting their hands into.

When the IMM2 door 2011B is at the third position, the IMM2 door 2011B is partially closed. The position of the distal end of the IMM2 door 2011B, when the IMM2 door 2011B is at the third position, can be designed as a position of the movable platen 62 in a situation where the moveable platen 62 is most distant from the fixed platen 61 while a mold is being inserted into or ejected from the IMM2. Based on this design, the IMM2 door 2011B cannot collide with any mold moving into/out of the IMM2, and the position of the IMM2 door 2011B does not need to be adaptively changed for various different molds.

The position of the distal end of the IMM2 door 2011B, when the IMM2 door 2011B is at the third position, can be designed so that the distal end of the IMM2 door 2011B reaches at least a position of the conveyor cover 370B in an X-axis direction. This design enables the IMM2 door 2011B and the conveyor cover 370B to enclose the inner region of the IMM2, thus, providing safety to the operators. The conveyor cover 370B combined with the conveyor door 380B covers the area between the B-B' line, which corresponds to the distal end position of the IMM2 door 2011B when located at the second position, and the C-C' line, which corresponds to the distal end position of the IMM2 door 2011B when located at the third position. In another exemplary embodiment, the distal end of the IMM2 door 2011B, when the IMM2 door 2011B is at the third position, can be located between the conveyor cover 370B, as long as the IMM2 door 2011B does not collide with a mold being inserted into/being ejected from the IMM2.

In the present embodiment, one of the first sensors 20131B is located near the proximal end of the IMM2 door 2011B when the IMM2 door 2011B is at the first position. Another of the first sensors 20131B is located near the distal end of the IMM2 door 2011B when the IMM2 door 2011B is at the first position. The first sensors 20131B are configured to detect if the IMM2 door 2011B is at the first position. In an alternative exemplary embodiment, t a single first sensor 20131B located near the proximal end of the IMM2 door 2011B can be used when the IMM2 door 2011B is at the first position. The single first sensor 20131B is configured to detect if the IMM2 door 2011B is at the first position by detecting if the proximal end of the IMM2 door 2011B is at a position corresponding to the first position.

In the present embodiment, one of the second sensors 20132B is located near the proximal end of the IMM2 door 2011B when the IMM2 door 2011B is at the second position. Another of the second sensors 20132B is located near the distal end of the IMM2 door 2011B when the IMM2 door 2011B is at the second position. The second sensors 20132B are configured to detect if the IMM2 door 2011B is at the second position. In an alternative exemplary embodiment, a single second sensor 20132B located near the distal end of the IMM2 door 2011B can be used when the IMM2 door 2011B is at the second position. The single second sensor 20131B is configured to detect if the IMM2 door 2011N is at the second position by detecting if the distal end of the IMM2 door 2011B is at a position corresponding to the second position.

In the present embodiment, two ball plungers 20134B are located along the door rail 2012B and the third sensors 20133B are configured to detect if a ball of the ball plungers 20134B yields to pressure. One of the ball plungers 20134B is located near the position of the proximal end of the IMM2 door 2011B when the IMM2 door 2011B is at the third position. Another of the ball plungers 2013B is located near the position of the distal end of the IMM2 door 2011B when the IMM2 door 2011B is at the third position. The ball plungers 20134B are located such that if the IMM2 door 2011B moves from the third position, one of the balls of the ball plungers 20134B yields to pressure applied from the IMM2 door 2011B. The third sensors 20133B detect if the IMM2 door 2011B is at the third position based on the states of the balls of the ball plungers 20134B.

In an alternative exemplary embodiment, the first position, second position, or the third position is not necessarily a specific single position, and any of the positions can have a predetermined range in the X-axis direction (the longitudinal or moving direction of the IMM2 door 2011B). For example, if the IMM2 door 2011B is in a first range, the controller 4 can recognize that the IMM2 door 2011B is at a first position. If the IMM2 door 2011B is in a second range, the controller 4 can recognize that the IMM2 door 2011B is at a second position. And, if the IMM2 door 2011B is in a third range, the controller 4 can recognize that the IMM2 door 2011B is at a third position. The first range, the second range, or third range can be defined based on various factors associated with the IMM2 door 2011B, such as tolerance, backlash, or rattle.

In the present embodiment, the IMM2 door 2011B includes a handle 2014B. The handle 2014B is fixed near the distal end of the IMM2 door 2011B and extends in the −X-axis direction. The handle 2014B is used to move the IMM2 door 2011B between the first position, the second position, and the third position. The handle 2014B includes a curved portion at one end, which fixed to the IMM2 door 2011B, and extends in the +Z-axis direction. The handle 2014B also includes a straight portion extending from the other end of the curved portion in the −X-axis direction.

At least a part of the straight portion is located over the IMM2 cover 60, when the IMM2 door 2011B is at the first or the third position. The length of the straight portion is such that the operators can grip the straight portion when the IMM2 door 2011B is at the first or the third position, as well as when the IMM2 door 2011B is at the second position. The handle 2014B enables operators to easily move the IMM2 door 2011B, especially when the conveyor door 380B is closed. In other words, the handle 2014B enables operators to easily open the IMM2 door 2011B even while the conveyor door 380B is closed.

FIG. 8A illustrates a cross sectional view of the IMM door 2011B and the door rail 2012B, at the A-A line in FIG. 7. FIG. 8B illustrates a cross sectional view of the IMM door 2011B and the door rail 2012B at B-B' line. In FIG. 8B, a position of the ball plunger 20134B is also illustrated. In the present embodiment the door 2011B includes an upper roller and a lower roller (not illustrated), which move along an upper rail and a lower rail (not illustrated fixed to the frame 10. The upper roller has a concave portion in the middle, which mates with a convex portion of the upper rail. The weight of the IMM door 2011B is mainly supported by the upper rail, where the lower roller and the lower rail align the position of the IMM door 2011B along the rail when the IMM door 2011B is moved. The ball plunger 20134B is located in the lower rail, and the ball of the ball plunger 20134B receives pressure or force from the lower roller. A top plate of the IMM door 2011B is located above the upper roller, and the handle 2014B is attached to the top plate of the IMM 2011B.

A straight portion of the handle 2014B is spaced apart from the top plate of the IMM 2011B to enable operators to grip the straight portion. Since the top plate can be located high above the ground, the distance between the straight portion and the top plate is as small as possible. In another exemplary embodiment, the straight portion can protrude from the side plate of the IMM door 2011B in +Y-axis direction, which can reduce the height of the handle 2014B.

Figure 10:
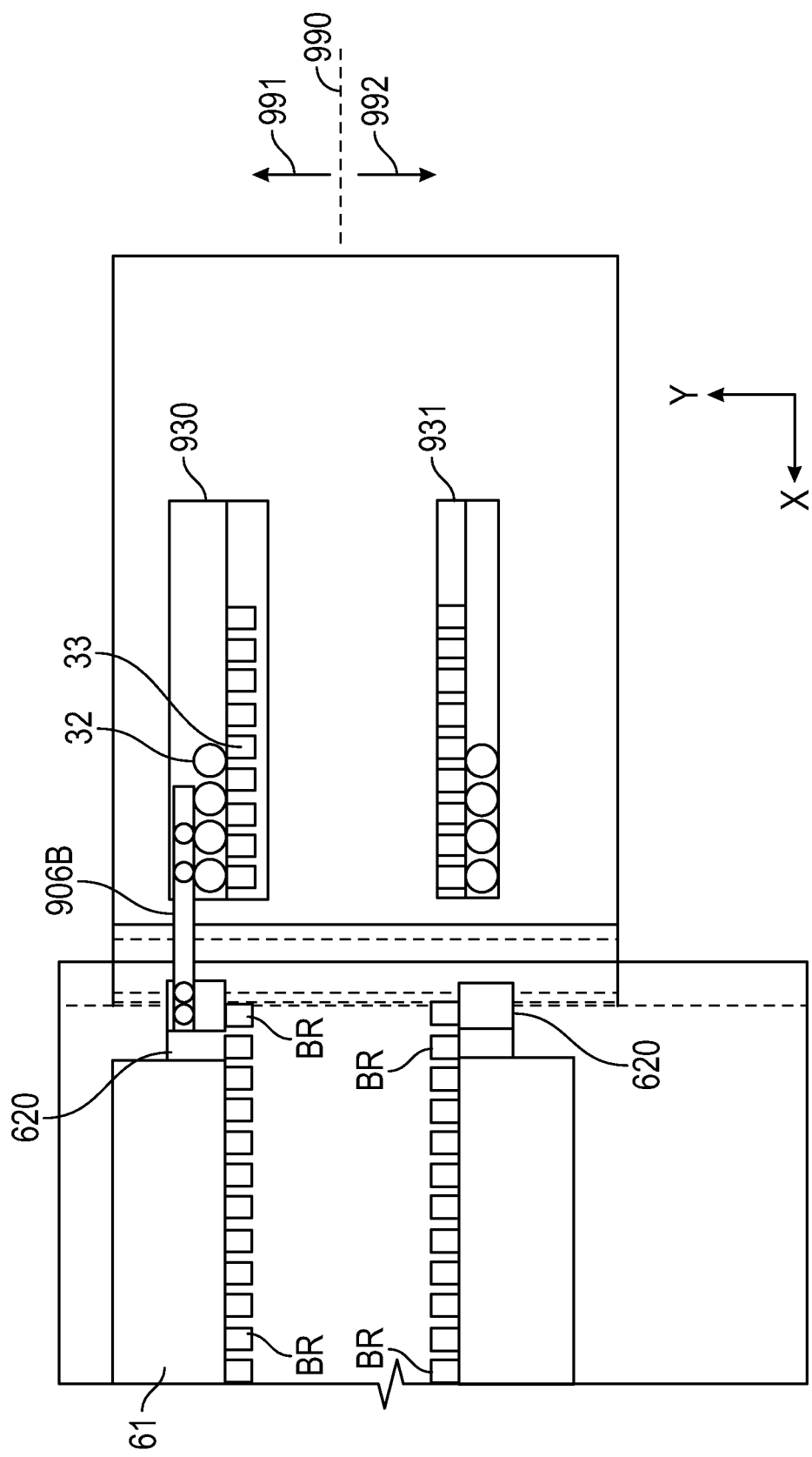
FIG. 10 illustrates structures of the injection molding system according to an exemplary embodiment.

FIGS. 9 and 10 illustrate a part of the structure of the injection molding system 1, including the fixed platen 61 and the L-shaped bracket 620B that is fixed to the fixed platen 61 according to the present embodiment. FIG. 9 is a side view from the center line 990 to the fixed platen's 61 side (fixed side 991). The dimensions or number of rollers illustrated in FIGS. 9 and 10 are provided for example/discussion purposes and are not seen to be limiting. The conveyor apparatus 3B includes a roller base 930 on the fixed side 992, and a roller base 931 on a moving side 993. Both the roller base 930 and the roller base 931 fix the rollers 32 facing the bottom of the mold 100B and the rollers 33 facing the side of the mold 100B.

The following descriptions disclose how the IMM 2 and the conveyor 3B are fixed to each other, and how the IMM 2 and the conveyor apparatus 3B are spaced apart from each other. The IMM 2 and the conveyor apparatus 3B are fixed by mainly two methods. First, the frame 10 of the IMM 2 and the frame 30 of the conveyor apparatus 3B are fixed with two L-shaped members 901 and 902. The first L-shaped member 901 is fixed to a side plate of the frame 10 with multiple bolts 903 arranged in rows and columns and inserted into corresponding holes on a vertical plate of the first L-shaped member 901. The second L-shaped member 902 is fixed to a side plate of the frame 30B with multiple bolts 903 arranged in rows and columns and inserted into corresponding holes on a vertical plate of the second L-shaped member 902. The L-shaped members 901 and 902 are fixed to each other with multiple bolts 905 inserted into multiple holes extending from a horizontal plate of the second L-shaped member 902 into a horizontal plate of the first L-shaped member 901. The L-shaped members 901 and 902 extend along the width of the side plate of the frame 30 of the conveyor apparatus 3B, as illustrated in FIG. 10. The lengths of horizontal plates of the L-shaped members 901 and 902, i.e., locations of the holes on the horizontal plates of the L-shaped members 901 and 902, define a distance or a gap between the IMM 2 and the conveyor apparatus 3B.

The second method to fix the IMM 2 and the conveyor apparatus 3B is a connection plate 906 fixed to the IMM 2 at one end and fixed to the conveyor apparatus 3B at the other end. The connection plate 906 is fixed to the IMM 2 with a top surface of the horizontal portion of the L-shaped bracket 620 attached to the fixed platen 920 with multiple bolts 907. The L-shaped bracket 620 attached to the fixed platen 920 has one or more holes on a top surface of the horizontal portion of the L-shaped bracket 620 to receive the bolts 907. The connection plate 906 is fixed to the conveyor apparatus 3B with a top surface of the roller base 930 with multiple bolts 908.

The connection plate 906, or more specifically, the length of the connection plate 906 and positions of the holes on the connection part define the distance or the gap between the IMM 2 and the conveyor apparatus 3B.

In another exemplary embodiment, one or more connection parts in addition to the L-shaped members 901 and 902 and the connection plate 906 can be included to securely fix the IMM 2 and the conveyor apparatus 3B with each other.

In another exemplary embodiment, the connection plate 906 can be fixed at the outer side surface of the L-shaped bracket 620 and the side surface of the frame 30. In this case, the IMM door rail 2012B can be extended longer, and the IMM door 2011B can move further to enable better coverage of the inner area of the IMM 2. In this case, the L-shaped bracket 620 attached to the fixed platen 61 has one or more holes on an outer surface, facing away from the movable platen 62, of the L-shaped bracket 620.

The conveyor apparatus 3A and the IMM 2 are fixed to each other in the same manner as described above with respect to the conveyor apparatus 3B and the IMM 2, and as such, a detailed description is omitted herein Generally, in an injection molding system, after its installation in a manufacturing facility, the injection molding machine gradually moves towards the −X-axis direction because the largest impulse applied to the injection molding is the impulse applied when the clamping apparatus slows the movable platen moving in the −X-axis direction away from the fixed platen for opening of the mold. In this situation the clamping apparatus applies force to the movable platen in the +X-axis direction, which results in the injection molding machine receiving impulse to move the injection molding machine in the −X-axis direction. In another situation, the injection molding machine receives impulses in the +X-axis and the −X-axis directions, or vibrations when the clamping apparatus starts, accelerates, slows or stops the movable platen.

In the present embodiment, by spacing apart the IMM 2 and the conveyor apparatus 3A/3B, impulses and vibrations do not directly affect the components of the conveyor apparatus 3A/3B. This contributes to longer component lives, especially for the actuator 3101A/B since because the mold 100A/100B is very heavy and the actuator 3101A/B can be damaged from large impulses repeatedly applied from the IMM 2. L-shaped brackets 901 and 902, the connection part 906 or the bolts 903, 904, 905, 907 and 908 for fixing these components can be damaged, but operators can replace these components for a relatively cheaper cost than replacing the actuator 3101A/B.

The conveyor apparatuses 3A and 3B apply impulses to the IMM 2 when the actuators 3101A and 3101B move the molds 100A and 100B. The impulses may not be larger than the impulses from the IMM 2 to the conveyor apparatus 3A/3B, but the spaced-part configuration of the present embodiment can also prevent the conveyor apparatuses 3A and 3B from damaging the IMM 2.

Another aspect of the above-described spaced-apart configuration is that it is easier for manufacturers or developers of conveyor apparatuses to develop or customize the conveyor apparatuses for various types of injection molding machines.

FIGS. 11A and 11B illustrates rollers 33 on the conveyor apparatus 3A/3B, the rollers BR in the IMM 2, and the mold 100A/100B. The following descriptions disclose spatial relationship between the rollers BR or rollers 33, and between the mold 100A/100B and the rollers BR or rollers 33.

FIG. 11A illustrates a situation of a mold 100A/100B where the mold 100A/100B is just supported by three rollers BR or three rollers 33 (collectively, roller or rollers 1101). A distance between centers of the rollers 1101 typically not more than half a length of a mold in order to support the bottom of the mold. If the distance is greater than that, the mold would be supported by only two rollers, which can cause tilting of the mold while the mold is moving, where the tilting mold moves below the supporting plane 1102 defined by the top points of the rollers 1101. The top points of the rollers 1101 may not be aligned in a line, and some rollers may be shifted in the Z-axis direction or the Y-axis direction. In this situation a part of the mold can sometimes be below the top point of a roller 1101 while the mold is moving. If the mold is so tilted that low-front edges of the mold collide with the roller at a point other than the top point, this can damage the roller and roller may need replacement. This requirement can be formulated by the following equation (1):

$$D_N \leq \frac{L_m}{2} (N \in N) \quad (1)$$

In FIGS. 11A and 11B, n indicates the number of rollers supporting the mold, N indicates the number, counted from left to right, for the most left roller 1101 in the n rollers. Both n and N are natural numbers. $R_N$ indicates an N-th roller 1101 counted from the left, $D_N$ indicates a distance between the center of the roller $R_N$ and the center of the roller $R_{N+1}$. $L_m$ indicates a length of a mold in a direction of a rows of rollers (X-axis direction). The length $L_m/2$ defines the maximum length of the gap between the IMM 2 and the conveyor apparatus 3A/3B. Typically, various types of molds are used in an injection molding system, but depending on the size of the injection molding system, a range of the size molds are usually defined for an injection molding system. Therefore, the maximum distance between the IMM 2 and the conveyor apparatus 3A/3B can be defined as $L_{min}/2$, in which $L_{min}$ indicates the minimum length of molds that can be used in an injection molding system.

An IMM door rail or an IMM door can be between the roller 1101 at the very end of the IMM 2 and the roller 1101 at the very end of the conveyor apparatus 3A/3B, so the length can be less than $L_{min}/2$.

FIG. 11B illustrates an injection molding system according to an exemplary embodiment. Only the differences from the injection molding system 1 illustrated in FIG. 1 will be described. In the present embodiment the mold 100B is supported by at least 4 rollers 1101, so n equals 4. FIG. 11B illustrates a situation where the mold 100B is supported by five rollers. The material or type of roller can be selected by a withstand load of the roller such that withstand load of a roller is greater than one fourth of the heaviest mold used in the injection molding system 1. $D_{N'}$ indicates a distance between the center of the roller BR at the very end of the IMM 2 and the center of the roller 33 at the very end of the conveyor apparatus 3B. $D_{rail}$ indicates the width of the IMM door rail 2012 in the X-axis direction. $D_{envr}$ indicates the actual distance or the gap between the IMM 2 and the conveyor apparatus 3B. $D_{envr}$ is less than $D_{N'}-D_{rail}$. In one exemplary embodiment, $L_m$ is 350 millimeters, $D_{N'}$ is 110 millimeters, and $D_{envr}$ is 10 millimeters.

In other exemplary embodiment, the distance between the gap is 1-20 millimeters. As described above, the gap varies depending on injection molding systems, a range of lengths of molds used in the injection molding system, withstand load of a selected roller, or other conditions.

The minimum of the distance between the IMM 2 and the conveyor apparatus 3A/3B can be less than 1 millimeter or less than 0.1 millimeter, but is typically greater than or equal to 1 millimeter.

The relationship between the above-described parameters is reflected in equation (2) below. When a mold with the minimum length Lm, from among the molds which can be used in the injection molding system, is n, the Lm is not more than the distance between a center of a roller RN and a center of a roller RN+n−1, and this relationship should be satisfied by any of the rollers BR or rollers 33.

$$\sum_{i=N}^{N+n-2}(D_i) \leq L_m \ (n, N \in N, n \geq 3) \quad (2)$$

In another exemplary embodiment, other types of structures or components can be provided for a mold. The above-described parameter n can vary depending on a partial region along the rollers. For example, in the IMM 2 the parameter n is 4 and in the conveyor apparatus 3B the parameter n can be a value other than 4.

FIG. 12A, FIG. 12B, FIG. 13A, and FIG. 13B illustrate flowcharts of processes performed by the injection molding system 1 based on control by the controller 4 according to the present exemplary embodiment. The CPU 402 of the controller 4 loads into the RAM the instructions in the computer program stored in the memory, and executes the instruction to perform the following processes.

Figure 12A:
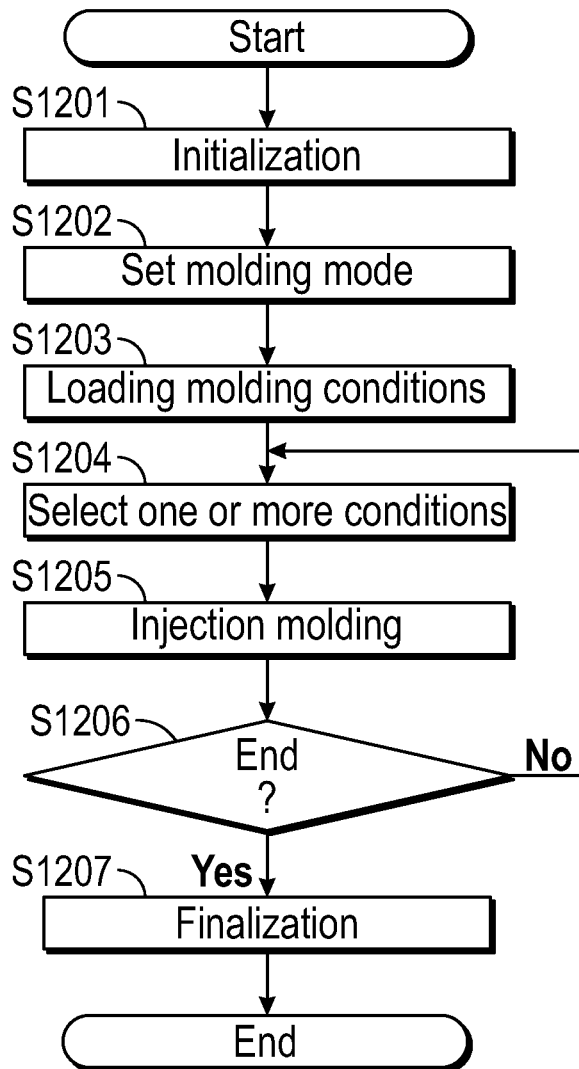
FIG. 12A is a flowchart illustrating processing of the injection molding system performing injection molding according to an exemplary embodiment.

FIG. 12A is a flowchart describing a process of the injection molding system 1 performing injection molding. Upon powering on of the injection molding system 1, the controller 4 starts an initialization process (S1201) to prepare for accommodating a mold and for performing the injection molding. The initialization process includes initialization process of the IMM 2 and the conveyor apparatuses 3A and 3B, in which, for example, the initialization of the conveyance units 31A and 31B. After the initialization is performed, the controller 4 sets a molding mode (S1202) from mode options, as described with reference to FIGS. 5 and 6.

After setting the molding mode, the controller 4 loads sets of molding conditions or molding tasks (S1203) into a molding task queue in the RAM or in the memory 401. Then the controller 4 selects a set of molding conditions (or a molding task) (S1204) for the next injection molding from the top of a molding task queue. The selected set of molding conditions is deleted from the top of the molding task queue, and the existing tasks are renumbered. The controller 4 loads the selected set of molding conditions and sets up the IMM2 for the next injection molding. The controller 4 then performs injection molding (S1205) with the inserted mold from the conveyor 3A/3B. When the injection molding of the selected molding conditions is completed, the controller 4 determines if the top of the molding task queue in the memory 401 has a set of molding conditions (S1201). If there is (N in S1206), the process returns to S1204 to select a new set of molding conditions from the top of the queue. If there is no set of molding conditions (Y in S1206), the controller 4 finalizes the process (S1207) and sets the IMM2 to an idle state.

When Mode 1 is selected in step S1202, two sets of molding conditions or tasks are selected by the controller 4 in step S1204, and in step S1205 the IMM2 performs injection molding with two molds in parallel.

In another exemplary embodiment, steps S1202 (a step of setting molding mode) and S1203 (a step of loading sets of molding conditions) can be performed in parallel to step S120. In yet another exemplary embodiment, the operation mode can be set for each of the molding tasks. In this embodiment, step S1202 (a step of setting molding mode) is performed as a part of step S1204 (a step of selecting a set of molding conditions).

Figure 12B:
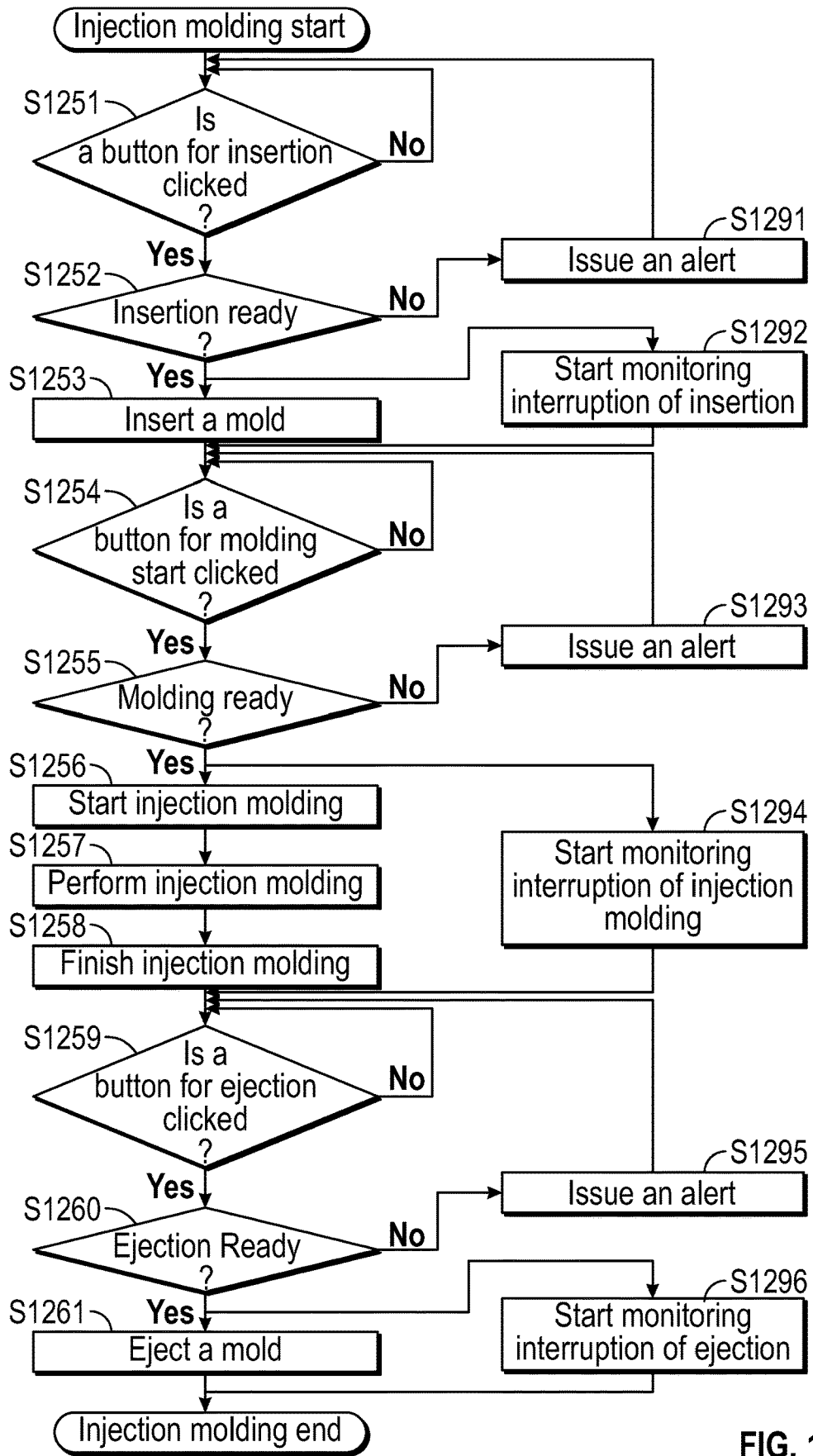
FIG. 12B is a flowchart illustrating processing of injection molding according to an exemplary embodiment.

FIG. 12B is a flowchart describing processes of injection molding of the IMM 2 operated in Mode 1 or Mode 2. In step S1251, the controller 4 determines if an operator requests mold insertion by, for example, clicking the insertion button 1503 or 1504 as described below. In Mode 1, by clicking one of buttons 1503 or 1504, one of the molds 100A or 100B will be inserted and at a later time the other mold will be automatically inserted without an operator clicking the other of the buttons 1503 and 1504. If mold insertion is not requested (No in S1251), then process waits for a request.

In step S1252, the controller 4 determines if the insertion of the mold 100A/100B is ready. For example, if the controller 4 detects that a mold is in the IMM 2, the controller 4 determines that the insertion is not ready. In other example, if the gap between the fixed platen 61 and the moveable platen 62 are smaller than the width in the Y-axis direction of the mold 100A/100B, the controller 4 determines that the insertion is not ready. If the IMM doors 2011A and 2011B and the conveyor doors 380A and 380B do not meet the conditions 1401 or 1402 described below with reference to FIG. 14, the controller 4 determines that the insertion is not ready. If the controller 4 determines that the insertion is not ready (No in S1252) the controller 4 controls the display 801 and the alert device 802 to issue an alert (step S1291). If the controller 4 determines that the insertion is ready, the controller 4 instructs the conveyor apparatus 3A/3B to insert the mold 100A/100B (S1253). In parallel to or immediately following the instruction, the controller 4 triggers the looping processes described below with reference to FIG. 13A for monitoring the insertion of the mold 100A/100B (S1292). The monitoring process started in S1292 continues at least while the insertion of the mold 100A/100B is being performed.

The controller 4 then determines if injection molding start is requested by, for example, detecting if the injection molding start button 1507 is selected by an operator (S1254). If the controller 4 determines that injection molding start is not requested (No in S1254), the process remains at S1254 until an injection molding start is requested. If the controller 4 determines that an injection molding start is requested (Yes in S1254), the process proceeds to step S1255.

In S1255, the controller 4 determines if the injection molding system 1 is ready for injection molding by determining if there are any related components not working appropriately. For example, in Mode 1, if one of the actuators 3101A and 3101B is not working properly, the controller 4 determines that the injection molding system 1 is not ready. For example, in Mode 2, the actuator 3101A or 3101B is not going to be used in the processes of injection molding, so even if the actuators 3101A and 3101B are not working properly, the controller 4 does not determine that the injection molding system is not ready. In an alternative exemplary embodiment, if the actuator 3101A/3101B on the mold insertion/ejection side is not working properly, the controller 4 determines that the injection molding system 1 is not ready. In either Mode 1 or Mode 2, if the components of the IMM 2 are not working properly, the controller 4 determines that the injection molding system 1 is not ready.

If the controller 4 determines that the injection molding system 1 is not ready (No in S1255), the controller 4 controls the display 801 and the alert device 802 to issue an alert (step S1293). If the controller 4 determines that the injection molding system 1 is ready (Yes in S1255), the controller 4 controls the IMM 2 to start injection molding (S1256). In addition, in parallel to or immediately following the start of the injection molding in S1256, the controller 4 triggers the looping processes described below with reference to FIG. 13A for monitoring the injection molding of the mold 100A/100B (S1294). The monitoring process started in S1294 continues at least while the insertion of the mold 100A/100B is being performed.

The IMM 2 then performs injection molding in the selected mode (S1257). When operated in Mode 1, the two molds are inserted and ejected repeatedly and alternately. When operated in Mode 1, one mold is in the IMM 2 for injection molding, and on one of the conveyor apparatus 3A/3B on the opposite side of the mold insertion/ejection side, operators set up a new mold for injection molding after the currently-performed injection molding in the IMM 2. The injection molding being performed can be interrupted by the instruction of the controller 4 in the looping processes started in S1293. After predetermined cycles of the injection molding are completed, the IMM 2 finishes the injection molding (S1258). In Mode 1, the IMM 2 finishes the predetermined cycles for both the mold 100A and 100B.

The controller 4 then determines if ejection of the mold 100A/100B is requested by, for example, detecting if the ejection button 1505 or 1506 is selected by an operator (S1259). If controller 4 determines that ejection of the mold 100A/100B is not requested (No in S1259), the process remains at S1259 until an ejection of the mold 100A/100B is requested. If the controller 4 determines that an ejection of the mold 100A/100B is requested (Yes in S1259), the process proceeds to step S1260.

In step S1260, the controller 4 determines if the ejection of the mold 100A/100B is ready. For example, if the controller 4 detects that a mold is in the IMM 2, the controller 4 determines that the ejection is not ready. In other example the nozzle 52 of the injecting apparatus 5 may not be retracted such that the distal tip of the nozzle 52 does not protrude from the inner surface of the fixed platen 61 facing the fixed mold 10101A/1010B. In such a situation, the controller 4 determines that the insertion is not ready. If the IMM doors 2011A and 2011B and the conveyor doors 380A and 380B do not meet the conditions 1410 or 1411 described below with reference to FIG. 14, the controller 4 determines that the ejection is not ready. If the controller 4 determines that the ejection is not ready (No in S1260) the controller 4 controls the display 801 and the alert device 802 to issue an alert (step S1291). If the controller 4 determines that the ejection is ready, the controller 4 controls the conveyor apparatus 3A/3B to eject the mold 100A/100B (S1261). In parallel to or immediately following the instruction, the controller 4 triggers the looping processes described with reference to FIG. 13A for monitoring the ejection of the mold 100A/100B (S1296). The monitoring process started in S1296 continues at least while the ejection of the mold is being performed.

Figure 13A:
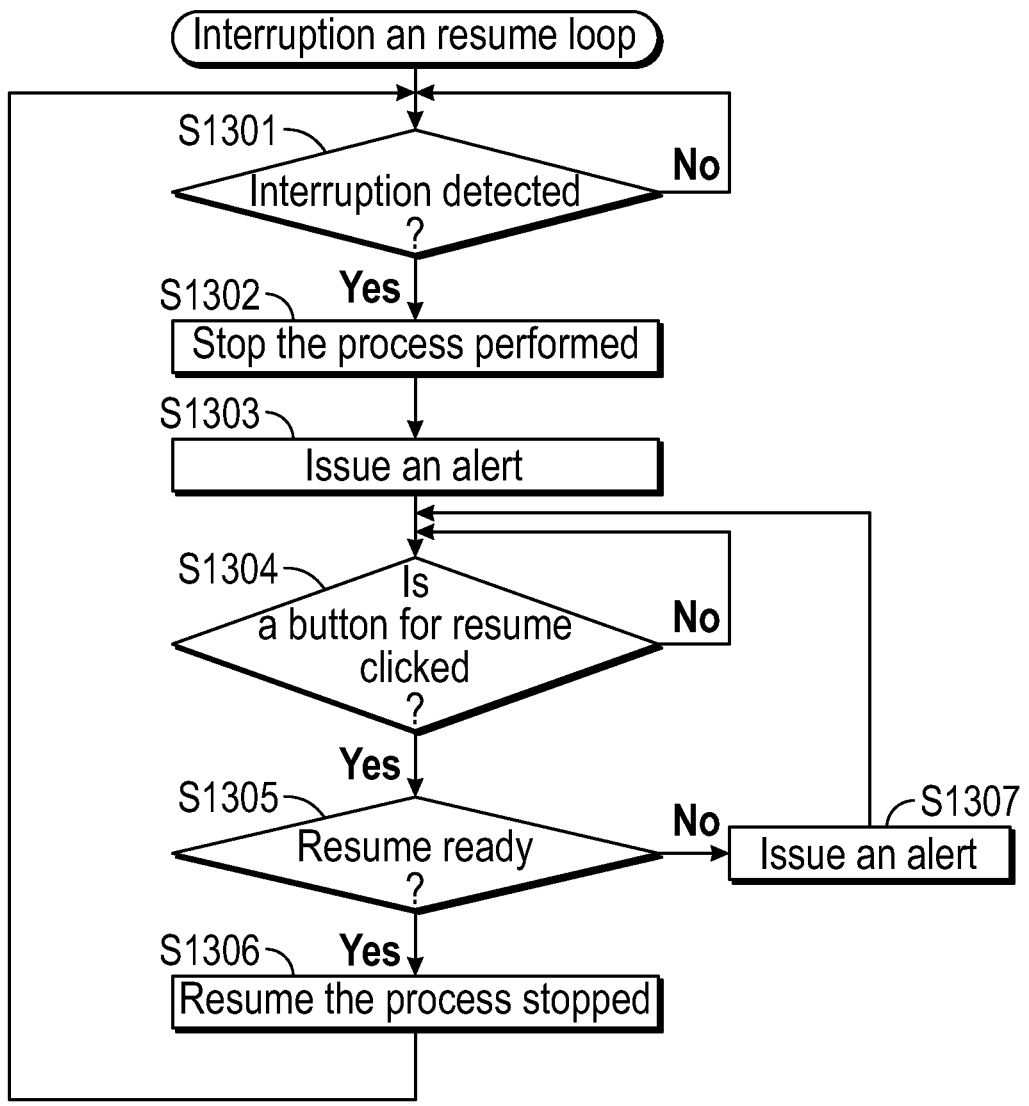
FIG. 13A is a flowchart illustrating looping processes of the injection molding system according to an exemplary embodiment.

FIG. 13A is a flowchart describing looping processes for interrupting a process and for resuming of the interrupted process. The looping process is started in step S1292 in response to a determination in S1252 that insertion is ready in step S1294 in response to a determination that injection molding is ready in S1255, and in step S1296 in response to a determination that ejection is ready in S1260. In step S1292 the looping process is for monitoring the insertion of the mold 100A/100B, for stopping the insertion, and for resuming the insertion. In step S1294 the looping process is for monitoring injection molding processes, for stopping the injection molding processes, and for resuming the injection molding processes. In step S1296 the looping process is for monitoring the ejection of the mold 100A/100B, for stopping the ejection of the mold 100A/100B, and for resuming the ejection of the mold 100A/100B.

In step S1301, the controller 4 keeps checking for the occurrence of one of the interrupting events until an event occurs. If there is no interrupting event detected (No in S1301) the controller 4 continues to check if the interrupting event occurs. The interrupting events are events in which abnormal situations occur with components of the injection molding system 1. The interrupting events include, for example, an event that the actuator 3101A/3101B issues an error while mold insertion or ejection is being performed, and an event that an operator pushes an emergency stop button of the injection molding system 1.

The interrupting events also include an event that specific conditions are not met by the IMM doors 2011A and 2011B or the conveyor doors 380A and 380B, as listed in FIG. 18 described below. When the controller 4 detects the interrupting event (Yes in S1301), the process proceeds to step S1302. In step S1302 the controller 4 controls the IMM 2 to stop processes of injection molding in the IMM 2, and in step S1303 the controller 4 controls the display 801 and the alert device 802 to issue an alert.

The process then proceeds to step S1304, where the controller determines if a button for resuming the process (insertion, ejection or injection molding) is selected by an operator. The controller 4 repeats the process of S1304 until detection that resumption of the process has been initiated. The button is described below with respect to buttons 1503 to 1507 illustrated in FIG. 15.

If a selection is detected (Yes in S1304) the process proceeds to step S1305, where the controller 4 determines if the components of the injection molding system 1 are ready for resumption. For example, in the situation of insertion or ejection, if the actuator 3101A/B used for the insertion has an error, the insertion is not resumed. If, during the injection molding, some components of the IMM 2 have an error, the injection molding is not resumed. In another example, if the specific conditions 1401-1403 or 1407-1412 are not met by the IMM doors 2011A and 2011B or the conveyor doors 380A and 380B in a corresponding situation, as described with reference to FIG. 14, the insertion, injection molding or ejection is not resumed.

If the controller 4 determines that the resume is not ready based on the states of the components (No in step S1305) the controller 4 controls the display 801 and the alert device 802 to issue an alert (step S1307). The process then returns to S1304. If the controller 4 determines that the resume is ready (Yes in S1305), the controller 4 controls the injection molding system 1 to resume the process stopped by the controller 4 in S1302 (S1306). This looping processes continues until the insertion, injection molding, or the ejection is completed.

In another exemplary embodiment, the looping processes for insertion, injection molding and ejection can be performed all the time, once the injection molding system is initialized in S1201, or until the injection molding system is finalized in S1207.

Figure 13B:
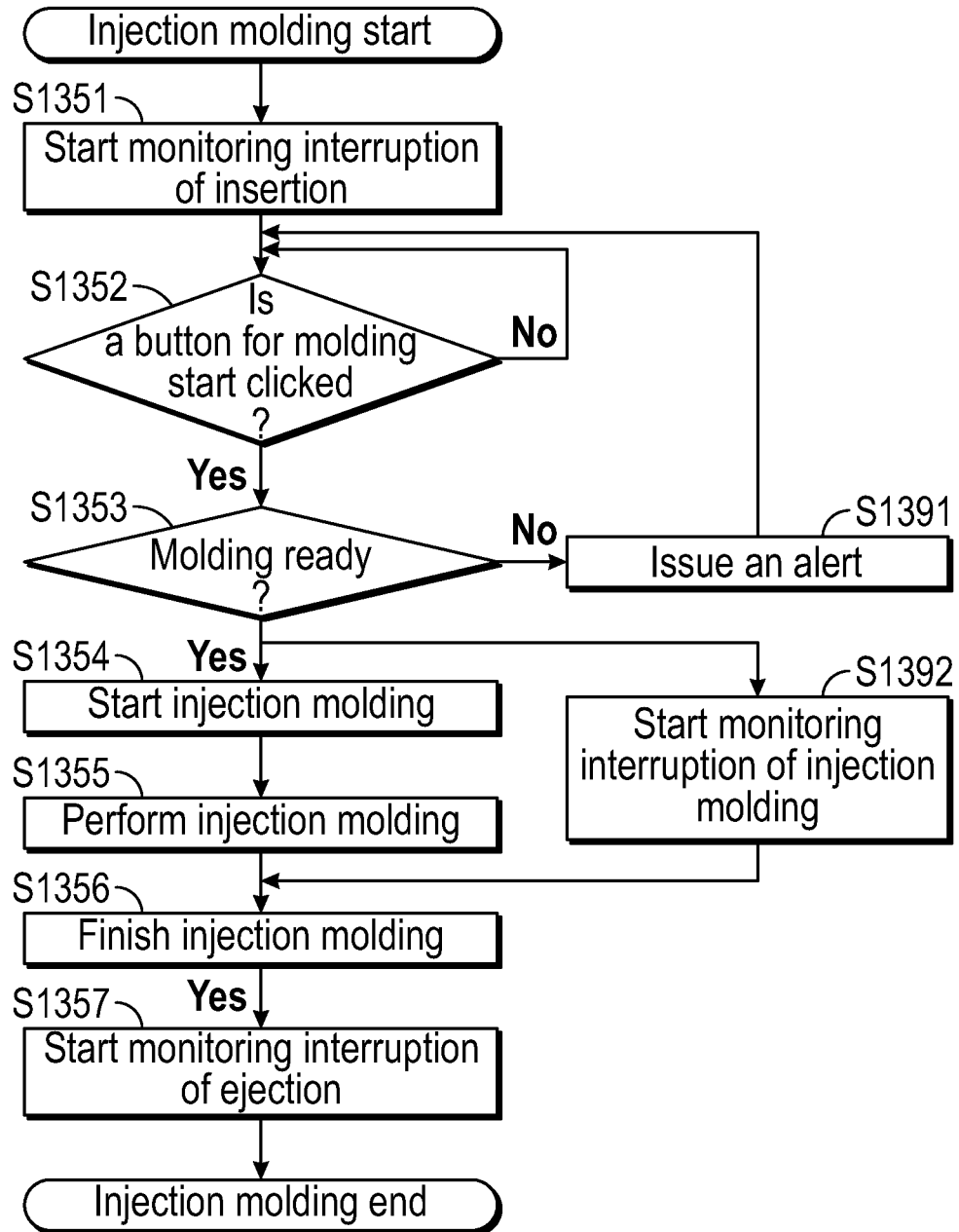
FIG. 13B is a flowchart illustrating processing of injection molding according to an exemplary embodiment.

FIG. 13B is a flowchart illustrating processes of the injection molding system 1 operated in Mode 3, where the insertion and ejection are performed manually be operators.

In step S1351, the controller starts monitoring to determine if any interrupting events occur by triggering the looping processes described with reference to FIG. 13A for monitoring the insertion of the mold 100A/100B. In this case, even if an error or abnormal situation occur with the conveyance unit 31A or 31B, the process of insertion is not interrupted. This monitoring process is performed while the operators are manually inserting the mold 100A/100B.

In step S1352, the controller 4 determines if an operator requests the injection molding to start by selecting a button for starting injection molding. If the request is not detected (No in S1352), the process remains at S1352 until a request is detected. If the controller 4 detects the request (Yes in S1352), the controller 4 determines if the injection molding system 1 is ready for injection molding. In this case, even if an error or abnormal situation occurs with the conveyance unit 31A or 31B, the process of insertion is not interrupted. With respect to the states of the IMM doors 2011A and 2011B and the conveyor doors 380A and 380B, the controller 4 determines if the conditions 1406 described below are met in S1353. With respect to the mold 100A/100B, controller 4 determines if the mold 100A/100B is appropriately positioned between the fixed platen 61 and the moveable platen 62 by position sensors (not illustrated) in the IMM 2 for the mold 100A/100B in S1353.

If injection molding is not ready (No in S1353), the controller 4 controls the display 801 and the alert device 802 to issue an alert (step S1391). If injection molding is ready (Yes in S1354), the controller 4 controls the IMM 2 to start injection molding (S1354), and the IMM 2 performs injection molding in Mode 3 (S1355).

Immediately after or in parallel to the starting of the injection molding in S1354, the controller 4 triggers looping processes described above with reference to FIG. 13A for monitoring the injection molding (S1392). Then the process proceeds to step S1356, where the controller 4 finishes injection molding until a predetermined number of cycles of injection molding are completed (S1393). In response to the completion of the injection molding, the controller 4 triggers looping processes described above with reference to FIG. 13A for monitoring the ejection of the mold 100A/100B (S1357). In this case, even if an error or abnormal situation occurs with the conveyance unit 31A or 31B, the process of insertion is not interrupted. The monitoring process started in S1357 continues at least while the operators are ejecting the mold 100A/100B out of the IMM 2. After a manual ejection of the mold 100A/100B, one molding task is completed in S1205.

FIG. 14 illustrates conditions of doors in each situation in each mode for determining if the IMM 2 or the conveyor apparatus 3A/3B stops its respective processes according to the present embodiment.

The conditions illustrated in FIG. 14 are stored in the memory 401 and are used by the controller 4 to determine stopping the processes. The doors are the IMM doors 2011A and 2011B and conveyor doors 380A and 380B. For discussion purposes the following descriptions describe the case where the conveyor apparatus 3A inserts and ejects the mold 100A, which means that the conveyor apparatus 3A's side is the side of the mold insertion/ejection side, and the conveyor apparatus 3B's side is the side of the mold insertion/ejection side. The following descriptions can be applied to the case where the conveyor apparatus 3B inserts and ejects the mold 100B.

The conditions for conveyor apparatus 3A and 3B are stored in the memory 401. These conditions should be met during the corresponding situation. If the controller 4 determines these conditions are not met, the controller 4 stops the processes or does not trigger the process requested, and also the controller 4 instructs the display 801 and the alert device 802 to issues an alert.

In Mode 1, the molds 100A and 100B are repeatedly inserted into and ejected from of the molding operation position 11 throughout the cycles of injection molding processes. The IMM doors 2011A and 2011B should be kept open, and therefore, the conveyor doors 380A and 380B should be kept locked or at least kept closed.

The conditions 1401 are used when the controller 4 controls the conveyor apparatus 3A to start the insertion of the mold 100A in step S1252, and monitors the insertion of the mold by the conveyor apparatus 3A in step S1292 to determine the conveyor apparatus 3A is controlled to stop the insertion of the mold 100A. In the condition 1401 the IMM door 2011A should be at the 3rd position, the IMM door 2011B should be at the $2^{nd}$ position, the conveyor door 380A should be kept closed, and the conveyor door 380B should be kept closed.

The conditions 1404 are used when the controller 4 controls the IMM 2 to start injection molding in step S1255. In the condition 1402 the IMM door 2011A should be at the 3rd position, the IMM door 2011B should be at the $2^{nd}$ position, the conveyor door 380A should be kept closed, and the conveyor door 380B should be kept closed.

The conditions 1407 are used when the controller 4 monitors the injection molding in step S1294 to determine whether to control the IMM 2 to stop the injection molding. In the condition 1407, the IMM door 2011A should be at the 3rd position, the IMM door 2011B should be at the $2^{nd}$ position, the conveyor door 380A should be kept closed, and the conveyor door 380B should be kept closed.

The conditions 1410 are used when the controller 4 determines whether to control the conveyor apparatus 3A to start the ejection of the mold 100A in step S1260, and monitors the ejection of the mold by the conveyor apparatus 3A in step S1296 to determine whether to control the conveyor apparatus 3A to stop the ejection of the mold 100A. In the condition 1410, the IMM door 2011A should be at the 3rd position, the IMM door 2011B should be at the $2^{nd}$ position, the conveyor door 380A should be kept closed, and the conveyor door 380B should be kept closed.

In Mode 2, the conveyor apparatuses 3A and 3B are used to insert the mold 100A into and eject the mold 100A from the IMM 2. The injection molding is performed as normal, and while the injection molding is performed on a conveyor apparatus other than the conveyor apparatus used to insert the mold, the setup of the new mold is performed by operators. Therefore, one of the IMM doors 2011A/2001B on the opposite side of the mold insertion side should be kept closed for operators to safely perform the setup. Since the IMM door 2011A/2001B on the mold insertion side is partially opened at the third position, the conveyor door 380A/380B on the mold insertion side should be locked or at least closed.

The conditions 1402 are used when the controller 4 determines to control the conveyor apparatus 3A to start the insertion of the mold 100A in step S1252, and monitors the insertion of the mold by the conveyor apparatus 3A in step S1292 to determine to control the conveyor apparatus 3A to stop the insertion of the mold 100A. In the conditions 1402, the IMM door 2011A should be partially opened at the third position, the IMM door 2011B on the opposite side of the mold insertion side should be kept closed at the $2^{nd}$ position, the conveyor door 380A should be kept closed, and the conveyor door 380B is unlocked and can be opened.

In another exemplary embodiment, because in the situation of insertion injection molding is not performed in the IMM 2, the IMM door 380A can be located at or between the $1^{st}$ position and the 3rd position. Even after injection molding for a mold is completed, the movable platen 62 can be moved for the next mold. In that case, the IMM door 380A should be located at the 3rd position while the movable platen 62 is adjusted, and after the adjustment of the movable platen 62, the IMM door 380A can be located at or between the $1^{st}$ position and the 3rd position. In order words, if these conditions are not met while it is detected by the controller 4 that the movable platen 62 is being adjusted, the controller 4 does not start the insertion of the mold 100A, or does stop the insertion of the mold 100A, and does control the display 801 and the alert device 802 to issue an alert. This exemplary embodiment is applicable to the conditions 1411 for the situation of ejection.

In another exemplary embodiment, the IMM door 2011B on the opposite side of the mold insertion side can be located at a position other than the $2^{nd}$ position in a case where the conveyor door 380B is locked or at least closed. In other words, in case where the conveyor door 380B is unlocked or opened and the IMM door 2011B is not at the $2^{nd}$ position, the controller 4 controls the conveyor apparatus 3A to stop insertion of the mold 100A, and controls the display 801 and the alert device 802 to issue an alert. These alternative conditions can be applied to the situation of molding start, the situation of during injection molding, and the situation of ejection. If the IMM door 2011B is opened and the conveyor door 380B is locked or at least closed, the controller 4 controls the display 801 and the alert device 802 to issue an alert, but the controller may not instruct the IMM 2 to stop the injection molding because the operators' safety is maintained by the conveyor door 380B.

The conditions 1405 are used when the controller 4 determines to control the IMM 2 to start injection molding in step S1255. In the conditions 1405, the IMM door 2011A should be partially opened at the third position, the IMM door 2011B on the opposite side of the mold insertion side should be kept closed at the $2^{nd}$ position, the conveyor door 380A should be kept closed, and the conveyor door 380B is unlocked and can be opened.

The conditions 1408 are used when the controller 4 monitors the injection molding in step S1294 to determine if the controller 4 is to control the IMM 2 to stop the injection molding. In the conditions 1408, the IMM door 2011A should be partially opened at the third position, the IMM door 2011B on the opposite side of the mold insertion side should be kept closed at the $2^{nd}$ position, the conveyor door 380A should be kept closed, and the conveyor door 380B is unlocked and can be opened.

The conditions 1411 are used when the controller 4 determines if the controller 4 instructs the conveyor apparatus 3A to start the ejection of the mold 100A in step S1260, and monitors the ejection of the mold by the conveyor apparatus 3A in step S1296 to determine if the controller 4 instructs the conveyor apparatus 3A to stop the ejection of the mold 100A. In the conditions 1411, the IMM door 2011A should be partially opened at the 3rd position, the IMM door 2011B on the opposite side of the mold ejection side should be kept closed at the $2^{nd}$ position, the conveyor door 380A should be kept closed, and the conveyor door 380B is unlocked and can be opened.

In Mode 3, insertion and ejection of the mold are performed manually by operators.

The conditions 1403 are used when the controller 4 monitors the insertion of the mold 100A from the conveyor apparatus 3A's side in step S1351 to determine if the controller 4 controls the display 801 and the alert device 802 to issue an alert. During the insertion from the conveyor apparatus 3A's side the IMM door 2011A should kept fully opened at the first position, or partially opened at the 3rd position. The IMM door 2011B should be kept closed at the $2^{nd}$ position. The conveyor doors 380A and 380B can be opened or closed.

In another exemplary embodiment, the alert is not issued by the display 801 or the alert device 802 when the IMM door 2011A is at or between the $1^{st}$ position and the $3^{rd}$ position. In yet another exemplary embodiment, the controller 4 does not instruct display 801 and the alert device 802 to issue an alert in a case that the IMM door 2011B is not closed. The conditions of these additional exemplary embodiments are also applicable to the situation of ejection.

The conditions 1406 are used when the controller 4 determines if the IMM 2 starts the injection molding in step S1353. Because the inserted mold 100A/100B is not fixed to the rod 3012A/3012B of the conveyor apparatus 3A/3B, the IMM door 2011A and 2011B can be closed for operator safety. The conveyor doors 380A and 380B can be opened, because the IMM door 2011A and 2011B are closed.

In another exemplary embodiment, the IMM door 2011A/2011B can be moved at or between the $2^{nd}$ and the $3^{rd}$ positions in a case that the conveyor door 380A/380B is kept closed or locked. In other words, the IMM door 2011A/2011B cannot be located between the $1^{st}$ and the 3rd positions or at the $1^{st}$ position even if the conveyor door 380A/380B is kept closed or locked. In addition, the IMM door 2011A/2011B can be moved out of the $2^{nd}$ position in case that the conveyor door 380A/380B is opened or unlocked. The conditions of this additional exemplary embodiment are also applicable to the situations of initiating and conducting injection molding.

The conditions 1409 are used when the controller 4 monitors the injection molding in step S1392 to determine if the controller 4 stops the injection molding. Because the inserted mold 100A/100B is not fixed to the rod 3012A/3012B of the conveyor apparatus 3A/3B, the IMM door 2011A and 2011B can be closed for operator safety. The conveyor doors 380A and 380B can be opened because the IMM door 2011A and 2011B are closed.

The conditions 1412 are used when the controller 4 monitors the ejection of the mold 100A from the conveyor apparatus 3A's side in step S1357 to determine if the controller 4 controls the display 801 and the alert device 802 to issue an alert. During the ejection of the mold 100A to the conveyor apparatus 3A's side, the IMM door 2011A should kept fully opened at the $1^{st}$ position, or partially opened at the 3rd position. The IMM door 2011B should be kept closed at the $2^{nd}$ position. The conveyor doors 380A and 380B can be opened or closed.

Figure 15:
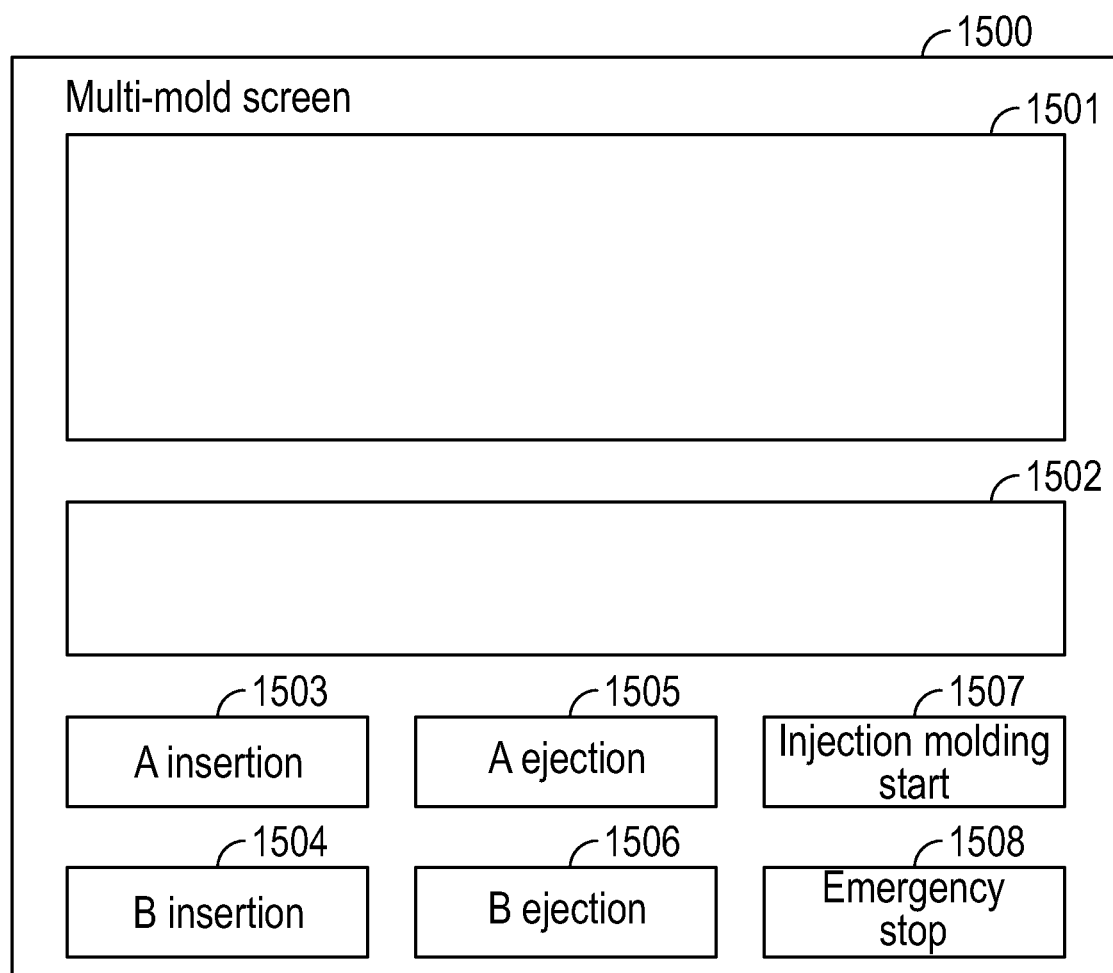
FIG. 15 illustrates a graphical user interface (GUI), according to an exemplary embodiment.

FIG. 15 illustrates a graphical user interface (GUI) displayed on the display 801 according to the present exemplary embodiment. The GUI 1500 includes an area 1501 for displaying states of the components of the injection molding system 1 including the conveyor apparatuses 3A and 3B and the IMM 2. The GUI 1500 also includes an area 1502 for displaying an alert or warning messages. The GUI 1500 also includes operational buttons 1503-1508 that each trigger a specific function or movement related to the injection molding system 1.

The button 1503 triggers mold insertion from the conveyor 3A. In a case where the button 1503 is selected, the conveyance unit 31A moves the mold 100A connected to the rod 3102A in the IMM 2 to the molding operation position 11. The button 1504 triggers mold insertion from the conveyor 3B. In a case where the button 1504 is selected, the conveyance unit 31B moves the mold 100B connected to the rod 3102B in the IMM 2 to the molding operation position 11. The button 1505 triggers mold ejection from the IMM 2 to the conveyor 3A. In a case where the button 1505 is selected, the conveyance unit 31A moves the mold 100A out of the molding operation position 11 in the IMM 2 to the conveyor 3A. The button 1506 triggers mold ejection from the IMM 2 to the conveyor 3B. In a case where the button 1506 is selected, the conveyance unit 31B moves the mold 100B out of the molding operation position 11 in the IMM 2 to the conveyor 3B.

The button 1507 triggers injection molding processes in the IMM 2. In a case where the button 1507 is selected, the controller 4 controls the IMM 2 to start the injection molding processes as described with reference to FIGS. 5 and 6. The button 1508 triggers a stop of the processes of injection molding or insertion/ejection of the mold. In response to selection of the button 1508, the controller 4 immediately stops the processes being performed in the injection molding system. More specifically, the injection molding processes in the IMM 2 or the movement of the mold 100A/100B by the conveyor apparatuses 3A and 3B is stopped.

In response to selection of one of the buttons 1503 through 1507, the controller 4 determines the states of the components in the IMM 2 to determine if the controller 4 trigger the function/movement of which the triggering is requested by operators as described with reference to FIGS. 12 through 14. If an issue exists with one of the components and the controller 4 determines not to trigger the function/movement, the controller 4 controls the display 801 to display in the area 1802a message indicating the component that is yet to be ready.

Figure 16:
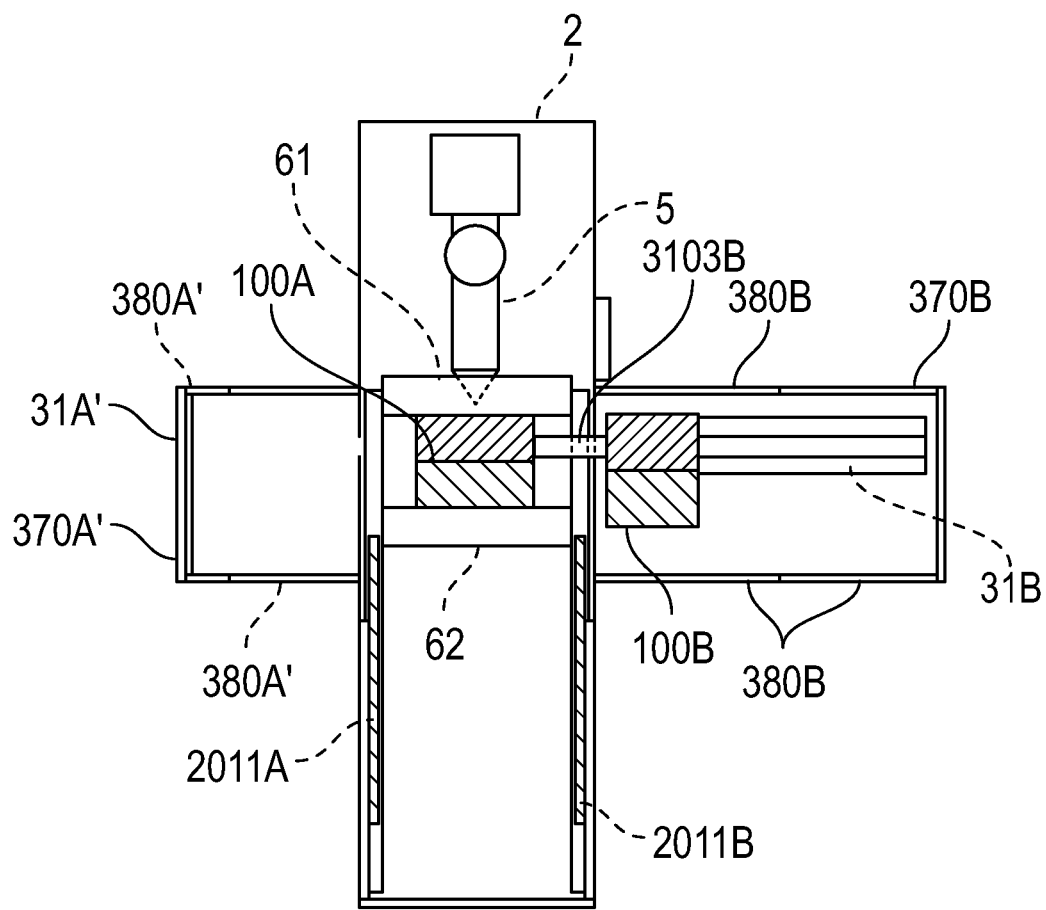
FIG. 16 illustrates an injection molding system according to another exemplary embodiment.

FIG. 16 illustrates an injection molding system according to another exemplary embodiment. Only the difference(s) from the injection molding system as illustrated in FIG. 1 is described herein. In the present exemplary embodiment, a conveyance unit is not provided on the conveyor apparatus 3A, while the conveyor apparatus 3B has the conveyance unit 31B. The rod (or, mold-actuator connection part) 3102B connects the actuator 3101B to the mold 100B, and transmits the actuation force from the actuator 3101B to the mold 100B. The injection molding system further includes a mold-mold connection part 3103B configured to connect the mold 100B and the mold 100A, which transmits the actuation force from the conveyance unit 31B to the mold 100A. While the conveyor apparatus 3A as illustrated in FIG. 1 has substantially the same size as the conveyance apparatus 3B, the conveyor apparatus 3A illustrated in FIG. 16 is smaller than the conveyor apparatus 3B, and has a space just for the mold 100B to be removed from the molding operation position 11. While not illustrated, the conveyor apparatus 3A includes the rows of rollers 33 in contact with the bottom of the mold 100A and the rows of rollers 32 in contact with the bottoms of the mold 100A for guiding the mold 100A while the mold 100A is being inserted into or ejected from the molding operation position 11.

The conveyor doors 380A are in the conveyor cover 370A', and are located on one side of the conveyor apparatus 3A along the mold's 100B moving direction and on the opposite side of the conveyor apparatus 3A. The conveyor door 380A on the one side rotates about a hinge fixed at one of the edge of the conveyor door 380A next to the IMM 2. The conveyor door 380A on the opposite side also rotates about a hinge fixed at one of the edge of the conveyor door 380A next to the IMM2. If the conveyor doors 380A are fully opened, the doors 380A are located approximately parallel to and along the side of the IMM 2. Because the molds 100A and 100B are fixed with each other, it is preferable to operate the injection molding system 1 in the Operation Mode 1. When operated in Mode 1, the IMM doors 2011A and 2011B are kept partially open at the 3rd positions.

Figures 17A, 17B:
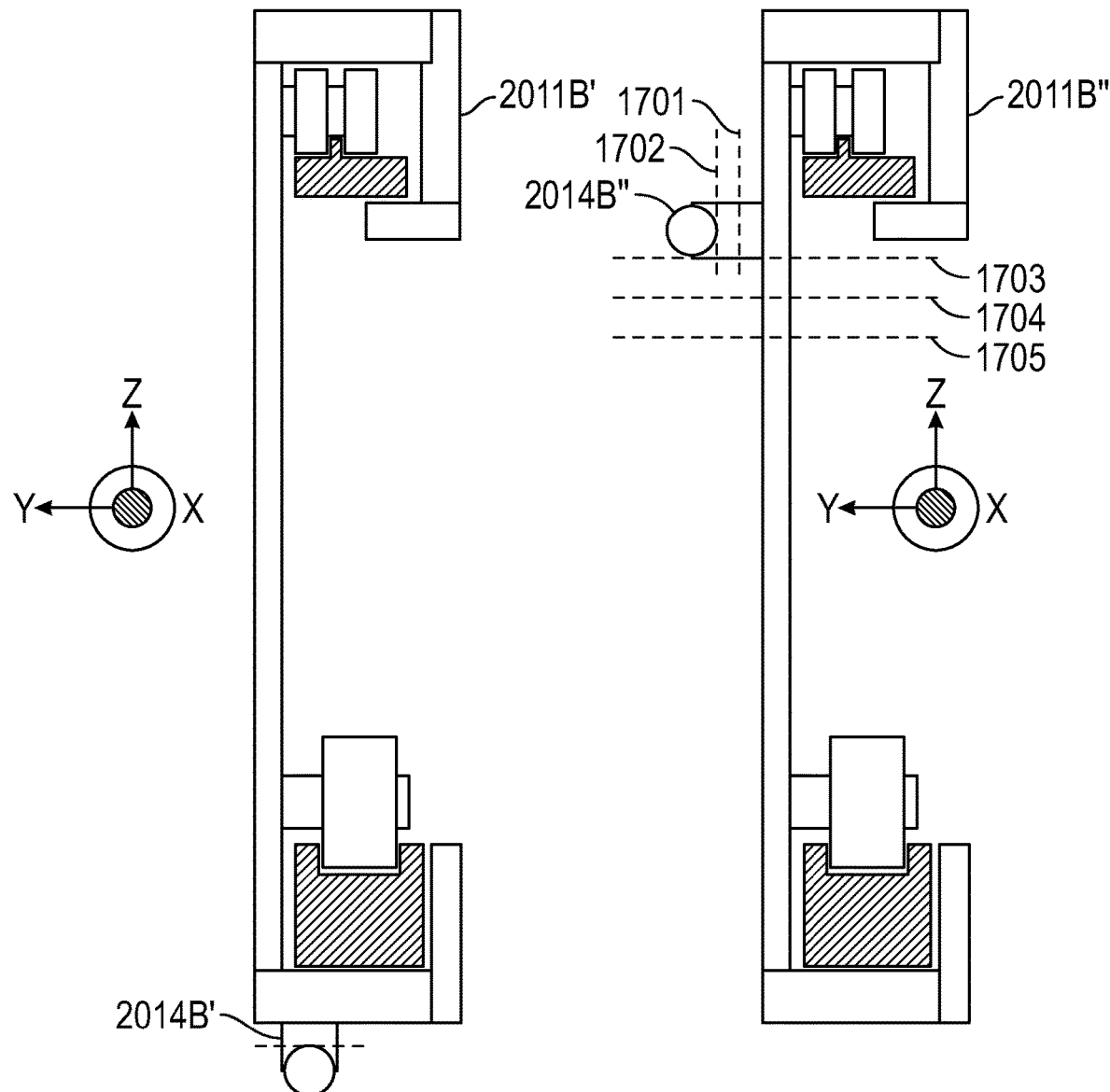
FIG. 17A is a cross sectional view of a door of the injection molding machine according to another exemplary embodiment.
FIG. 17B is a cross sectional view of a door of the injection molding machine according to another exemplary embodiment.

FIG. 17A illustrates a cross sectional view of the IMM door 2011B', according to the present embodiment. Only the difference(s) from the IMM door 2011B as illustrated in FIGS. 8A and 8B is described. In the present embodiment the handle 2014B' is fixed to a bottom plate of the IMM door 2011B'. The handle 2014B' is accessible when a top plate of the IMM door 2011B' is located high above the ground. A straight portion of the handle 2014B in FIG. 8 is located almost immediately above a side plate of the IMM door 2011B. A straight portion of the handle 2014B' in FIG. 17 is set back in the −Y-axis direction from a side plate of the IMM door 2011B'. While in the IMM door 2011B, the handle 2014B is as close to the operators as possible, in the IMM door 2011B', the handle 2014B' is set back, which provides for the handle 2014B' not hitting the operators' legs or hands since the operators' legs, hands or other body parts can be in a space between the IMM door 2011B' and the ground.

FIG. 17B illustrates a cross sectional view of the IMM door 2011B" according to yet another exemplary embodiment. Only the difference(s) from the IMM door 2011B, as illustrated in FIGS. 8A and 8B, is described. In the present exemplary embodiment, the handle 2014B" is fixed to a side plate of the IMM door 2011B", and protrudes from the side plate in the +Y-axis direction. A straight portion needs to be spaced apart from the side plate of the IMM door 2011B', for operators to grip the straight portion, and to avoid a collision between the straight portion and the cover 60 of the IMM 2. A line 1701 indicates the position of the outer surface of the cover 60, and a line 1702 indicates the position of the straight portion that is closest to the side plate. The straight portion is further away from the side plate than the line 1701, and the line 1702 is spaced apart from the line 1701 to enable operators to grip the straight portion of the handle 2014B".

A line 1703 indicates a bottom surface of the handle 2014B", a line 1704 indicates the position of an upper frame of the conveyor cover 370B, and a line 1705 indicates the position of the highest possible height of molds used with the conveyor 3B. The handle 2014B" needs to be located upwardly away from the line 1705 in order not to collide with the mold 100B. The line 1703 can be below the line 1704, but in that case, the conveyor cover 370B is provided a notch or cutout for the handle 2014B" to pass through, while the IMM door 2011B" is moving. The handle 2014B" and/or the conveyor cover 370B can include a sensor to detect an operator's hand at the notch.

According to another exemplary embodiment, the handle does not need to have a straight portion. Instead of the straight portion, a portion (or a grip portion) that is supposed to be gripped by operators can be provided with the handle. Also, instead of the curved shaped portion, a portion (or a fixing portion) configured to fix the grip portion with the top, bottom or side plate of the IMM door can be provided with the handle.

FIG. 18 illustrates the side view and the cross sectional view of the IMM door 2011B''' according to yet another exemplary embodiment. Only the difference(s) from the IMM door 2011B, as illustrated in FIGS. 8A and 8B, is described. In the present exemplary embodiment, the handle 2014B is not required, and instead actuator 1800 is provided with the IMM door 2011B'''. The actuator 1800 includes a cylinder 1801 with a motor, a rod 1802 configured to be moved by the cylinder 1801 along the longitudinal direction of the cylinder 1801, a connection part 1803 configured to connect to the IMM door 2011B'''. The IMM door 2011B''' includes a fixture base 1804 configured to fix the connection part 1803 with, for example, bolts and nuts. In the present embodiment the fixture base 1804 is fixed to a side plate of the IMM door 2011B''', and protrudes in the −Y-axis direction. A distal end of the actuator 1800, or the connection part 1803, is fixed to the fixture base 1804, and a proximal end of the actuator 1800 is fixed to the cover 60 of the frame 10 of the IMM 2.

The actuator 1800 also includes a first button 1805 to initiate movement of the rod 1801 in the −Y-axis direction to close the IMM door 2011B''', a second button 1806 to initiate movement of the rod 1801 in the +Y-axis direction to open the IMM door 2011B''', and a third button 1807 to initiate stopping movement of the rod 1801. The buttons 1805-1807 are fixed on the cover 60 and connected to the actuator 1800. Another set of buttons 1805', 1806', and 1807' can be provided on a plate 1808 fixed to the frame 10 near the display 801. In that case, the operators can operate the IMM door 2011B''' on both sides of the conveyor 3B. In the present embodiment, operators can also manually move the IMM door 2011B".

The IMM door 2011B''' according to the present embodiment also enables operators to move the IMM door 2011B"" without the need for a handle, but with an actuator to move the IMM door 2011B"", and buttons to operate the actuator 1800.

Figure 19:
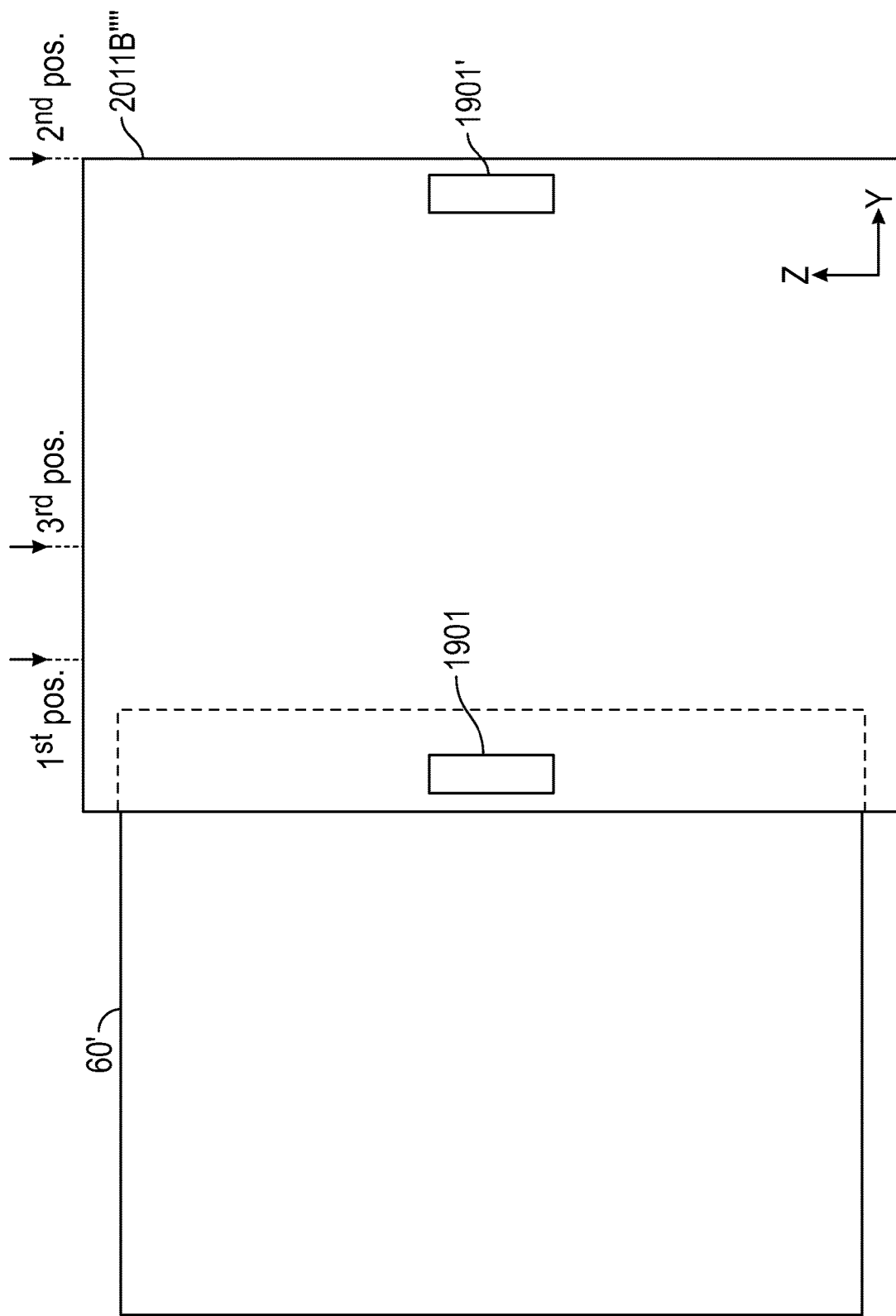
FIG. 19 is a side view of a door of the injection molding machine according to another exemplary embodiment.

FIG. 19 illustrates a side view of the IMM door 2011B"" according to still yet another exemplary embodiment. Only the difference(s) from the IMM door 2011B, as illustrated in FIGS. 8A and 8B, is described. In the present exemplary embodiment, the cover 60' can be covered by the IMM door 2011B"", whereas in the above-described exemplary embodiment(s) the IMM door 2011B is housed by the cover 60. In other words, the IMM door 2011B"" is outside the cover 60'. The IMM door 2011B"" has a recess portion on its side plates, which enables the operators to grab and manually operate the IMM door 2011B''''. The recess portion is located close to a proximal edge of the IMM door 2011B''''. Wherever the IMM door 2011B'''' is located, at least a part of the IMM door 2011B'''', around the recess portion 1901, is always exposed so the operators can operate the IMM door 2011B'''' relatively easily even when the conveyor door 380B is closed. The IMM door 2011B'''' can have another recess portion 1901' near a distal end of the IMM door 2011B''''.

Three operational modes have been discussed in the above-described exemplary embodiments as being implemented in the injection molding system 1. However, the number of modes is not limited to three, and a number of modes that would enable practice of the present disclosure is applicable.

As described above, the Mode 3 is selected when both the conveyor apparatuses 3A and 3B are not used. However, different modes can be set for the conveyor apparatus 3A's side and the conveyor apparatus 3B's side. For example, for injection molding with a first mold inserted from the conveyor 3A's side, the Mode 2 can be selected. For injection molding with a second mold inserted from the conveyor 3B's side, the mode 3 can be selected when only the second mold cannot be used with the conveyor apparatus or only the conveyor apparatus 3B needs to be fixed. The controller 4 controls processes of the injection molding with the second mold based on the processes illustrated in FIG. 13B, while the controller 4 controls processes of the injection molding with the first mold based on the processes illustrated in FIG. 13A.

As described above, the controller 4 of the injection molding system can automatically check the type of a first mold or the status of the conveyor apparatus and determines if the conveyor apparatus is used for the first mold or not, when a set of molding conditions of the first mold is received or selected. If the controller 4 determines the conveyor apparatus is not used with the first mold, the system automatically selects Mode 3 for the first mode, or recommends to operators the Mode 3 by, for example, causing the display 801 to display a message that that Mode 3 should be selected.

In another exemplary embodiment, sensors can be provided that are able to simultaneously detect the status between the cover 60 or 60' and the IMM door 2011, 2011', 2011'', 2011''', or 2011''''.

According to an exemplary embodiment, an injection molding system includes an injection molding apparatus configured to perform injection molding with a mold, and a conveyor apparatus configured to insert a mold through an opening of the injection molding apparatus. The injection molding apparatus includes a first door configured to cover a first opening when a first door is closed, a second door configured to cover a second opening when the second door is closed. The injection molding system also includes a controller configured to start injection molding with the mold in a case that the first door is partially opened and the second door is closed.

According to another exemplary embodiment, an injection molding system includes an injection molding apparatus configured to perform injection molding with a mold, a conveyor apparatus including a rod configured to be fixed to a mold to insert the mold through an opening of the injection molding apparatus. The injection molding apparatus also includes a first door configured to cover a first opening when the first door is closed, a second door configured to cover a second opening of the injection molding apparatus when the second door is closed. The injection molding system includes a controller configured to start injection molding in a case where the first door is partially opened for the rod to extend into the first opening from the conveyor apparatus, and to stop injection molding with the mold in response to the first door's movement.

According to yet another exemplary embodiment, an injection molding system includes an injection molding apparatus configured to perform injection molding with a mold, one or more conveyor apparatuses configured to insert and eject molds alternately while the injection molding is performed with the molds. The injection molding apparatus also includes a first side surface with a first opening through which one of the molds is inserted or ejected, a first door configured to cover the first opening, a second side surface opposite to the first side with a second opening through which the other mold is inserted and ejected, a second door configured to cover the second opening. The injection molding system includes a controller configured to stop injection molding based on movement of at least one of the first or the second door.

According to still yet another exemplary embodiment, an injection molding system includes an injection molding apparatus configured to perform injection molding with a mold, a conveyor apparatus including a conveyance unit configured to insert a mold through an opening of the injection molding apparatus, and a conveyor cover with a conveyor door configured to surround the conveyance unit. The injection molding apparatus also includes an injection molding apparatus door configured to cover the opening when the door is closed. The injection molding system includes a controller configured to stop injection molding with the mold in a case where both the conveyor door and the injection molding apparatus door are opened or unlocked.

According to another exemplary embodiment, an injection molding system includes an injection molding apparatus configured to perform injection molding with a mold inserted or ejected through an opening, a door configured to cover the opening when the door is closed, and a conveyor apparatus configured to insert a mold through the opening of the injection molding apparatus. The conveyor apparatus also includes a conveyor cover with a conveyor door configured to block access to the conveyor apparatus in a case where the conveyor door is closed. The door includes a handle that is configured to be accessible from outside an area surrounded by the conveyor cover and the closed door, in a case where the door is closed to cover the opening.

According to another exemplary embodiment, an injection molding system includes an injection molding apparatus configured to perform injection molding with a mold inserted or ejected through an opening, a conveyor apparatus (3A, 3B) configured to insert a mold through the opening, and a connection part configured to fix the conveyor apparatus with the injection molding apparatus in a manner such that a side surface of the injection molding apparatus and a side surface of the conveyor apparatus facing each other are spaced apart. In the injection molding system, a distance ($D_{envr}$) between the side surface of the injection molding apparatus and the side surface of the conveyor apparatus is greater than or equal to 1 mm and not more than a half of a mold with the maximum length ($L_m$) in a direction of the distance in the molds that can be used with the injection molding system. The injection molding apparatus includes a first row of support members configured to support the bottom of the mold, and the conveyor apparatus includes a second row of support members (33) configured to support the bottom of the mold and are aligned with the first row of support members. The support members in the first and the second row and the mold meet the equation (2) described above.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. An I/O interface can be used to provide communication interfaces to input and output devices, which may include a keyboard, a display, a mouse, a touch screen, touchless interface (e.g., a gesture recognition device) a printing device, a light pen, an optical storage device, a scanner, a microphone, a camera, a drive, communication cable and a network (either wired or wireless).

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Combinations of any exemplary embodiments disclosed above are also included as embodiments of inventions disclosed. While the above-described exemplary embodiments discuss illustrative embodiments, embodiments of inventions disclosed is not limited to these exemplary embodiments.

The invention claimed is:

1. An injection molding system comprising:
an injection molding apparatus, wherein the injection molding apparatus includes a frame and includes first support members configured to support a bottom of the mold, and wherein the injection molding apparatus includes a first support base that holds the first support members; and
a conveyor apparatus configured to move a mold between a first position in the injection molding apparatus and a second position different from the first position, wherein the conveyor apparatus supports the mold when the mold is located at the second position, wherein the conveyor apparatus includes a frame and includes second support members configured to support the bottom of the mold, and wherein the conveyor apparatus includes a second support base that holds the second support members,
wherein the improvement to the injection molding system includes:
an upper connection part and a lower connection part configured to fix the conveyor apparatus with the injection molding apparatus such that a part of the injection molding apparatus that is closest to the conveyor apparatus and a part of the conveyor apparatus that is closest to the injection molding apparatus are spaced apart, such that the first support members are aligned with the second support members in a direction in which the mold moves when moving between the first position and the second position, and such that the first support base and the second support base are spaced apart,
wherein a first end of the upper connection part is fixed to the first support base and a second end of the upper connection part is fixed to the second support base, and
wherein a first end of the lower connection part is fixed to a base of the frame of the injection molding apparatus and a second end of the lower connection part is fixed to a base of the frame of the conveyor apparatus.

2. The injection molding apparatus of claim 1, wherein a distance between the part of the injection molding apparatus that is closest to the conveyor apparatus and the part of the conveyor apparatus that is closest to the injection molding apparatus is greater than or equal to 1 mm and not more than a half a length of a mold in a direction of the distance.

3. The injection molding system according to claim 1, wherein the first support members include at least a first row of support members,
wherein the second support members include at least a second row of support members aligned with the first row of support members, and
wherein the following equation is true, wherein n represents a minimum number of support members supporting the mold in the first row and the second row, N represents a value according to a number of support members existing between a support member at a predefined position and a support member identified from among the N number of support members, Di represents a distance between a center of an i-th support member and a center of an i+1-th support member, and Lm represents a length of the mold in a direction along the first row or the second row:

$\Sigma_{i=N}^{N+n-2}(D_i) \leq L_m$ $(n, N \in \mathbb{N}, n \geq 3)$.

4. The injection molding system according to claim 3, wherein the predefined position is a position of a distal end of a support member in the first row or the second row.

5. The injection molding system according to claim 1, wherein the lower connection part includes at least two connection parts.

6. The injection molding system according to claim 5, wherein, among the at least two connection parts, a first connection part is fixed to a side surface of the injection molding apparatus and a second connection part is fixed to a side surface of the conveyor apparatus, wherein the first connection part and the second connection part are fixed by at least one fixing unit.

7. The injection molding system according to claim 1, wherein the lower connection part includes an L-shaped member, and wherein the lower connection part is fixed by bolts.

8. The injection molding system according to claim 1, wherein the lower connection part includes a plate, wherein a first end of the plate is fixed to the injection molding apparatus and a second end of the plate is fixed to the conveyor apparatus.

9. The injection molding system according to claim 1, wherein the first support members and second support members are rollers used for moving the mold, wherein the mold moves between the first position and the second position based on a force from the conveyor apparatus in a situation where the mold is supported by at least some of the rollers.

10. The injection molding system according to claim 1, further comprising:
another conveyor apparatus configured to move another mold between the first position and a third position, wherein the another conveyor apparatus supports the another mold when the another mold is located at the third position, and
another connection part configured to fix the another conveyor apparatus with the injection molding apparatus such that a side surface of the injection molding apparatus and a side surface of the another conveyor apparatus facing each other are spaced apart.

11. The injection molding system according to claim 1, wherein the first position is a molding operation position for the injection molding apparatus to inject a material of a molding product and the second position is a cooling position at which the mold is placed during a cooling time for cooling the material.

12. A method for manufacturing a molded product using the injection molding system according to claim 1, the method comprising:
moving, by the conveyor apparatus, the mold from the second position to the first position;
injecting, by the injection molding apparatus, a material of the molded product into the mold at the first position; and
removing the molded product from the mold.

13. The injection molding system according to claim 1, wherein the injection molding apparatus includes a door, wherein the door is configured to move between a first door position and a second door position,
wherein, in the first door position, the door resides between the first support base and the second support base and resides between the first support members and the second support members, and wherein, in the second door position, none of the door is between the first support members and the second support members.

14. The injection molding system according to claim 13, wherein the door is configured to roll or slide between the first door position and the second door position.

15. The injection molding system according to claim 13, wherein a distance between (i) a support member, of the first support members, that is closest to the second support members and (ii) a support member, of the second support members, that is closest to the first support members, is greater than a sum of (1) a width of the door and (2) a distance between the part of the injection molding apparatus that is closest to the conveyor apparatus and the part of the conveyor apparatus that is closest to the injection molding apparatus.

16. An injection molding system comprising:
a conveyor apparatus;
an injection molding apparatus;
an upper connection part; and
a lower connection part,
wherein the conveyor apparatus includes
an actuator configured to provide a force to move a mold between a first position in the injection molding apparatus and a second position different from the first position,
first support members configured to support a bottom of the mold,
a first support base configured to hold the first support members, and
a supporting structure configured to support the first support base;
wherein the injection molding apparatus includes
second support members configured to support a bottom of the mold, and
a second support base configured to hold the second support members; and
wherein the upper connection part and the lower connection part are configured to fix the conveyor apparatus with the injection molding apparatus such that a part of the injection molding apparatus that is closest to the conveyor apparatus and a part of the conveyor apparatus that is closest to the injection molding apparatus are spaced apart, such that the first support members are aligned with the second support members in a direction in which the mold moves when moving between the first position and the second position, and such that the first support base and the second support base are spaced apart,
wherein a first end of the upper connection part is fixed to the first support base and a second end of the upper connection part is fixed to the second support base, and
wherein a first end of the lower connection part is fixed to a base of the frame of the injection molding apparatus and a second end of the lower connection part is fixed to a base of the frame of the conveyor apparatus.

* * * * *